United States Patent

[11] 3,630,720

[72] Inventor Georg Messner
Latemar Strasse 7, 8000 Munich 90,
Germany
[21] Appl. No. 807,707
[22] Filed Mar. 17, 1969
[45] Patented Dec. 28, 1971
Continuation-in-part of application Ser. No.
394,873, Sept. 8, 1964, now abandoned.
This application Mar. 17, 1969, Ser. No.
807,707

[54] PROCESS FOR THE EXTRACTION OF ALUMINUM
FROM ITS ALLOYS
21 Claims, 20 Drawing Figs.
[52] U.S. Cl...................................................... 75/68 R,
75/63, 75/81, 23/273 F, 210/386
[51] Int. Cl........................................................ C22b 21/06
[50] Field of Search........................................... 75/68, 63,
81, 101; 210/386; 23/270, 273 F, 310

[56] References Cited
UNITED STATES PATENTS
3,092,515 6/1963 Pike et al..................... 23/270 X
3,102,805 9/1963 Messner....................... 75/68 R
3,263,598 8/1966 Sylla............................ 210/386 X Primary Examiner—L. Dewayne Rutledge
Assistant Examiner—J. Davis
Attorney—Hammond & Littell ABSTRACT: Describes a process of recovering relatively pure aluminum from an aluminum alloy by charging solid aluminum alloy particles into a circulating mercury stream at atmospheric pressure, transporting the mixed stream downwardly to a melting and extraction zone maintained at a temperature of about 485° to 530° C. and a pressure of about 11 atmospheres, adding additional mercury to the extraction zone, discharging the undissolved residue at atmospheric pressure, maintaining said pressure by mercury columns at atmospheric pressure at their tops, and crystallizing aluminum from the aluminum-mercury solution by spraying the solution at atmospheric pressure to rapidly cool the mercury and crystallize the aluminum therefrom.

INVENTOR
GEORG MESSNER
BY
ATTORNEYS

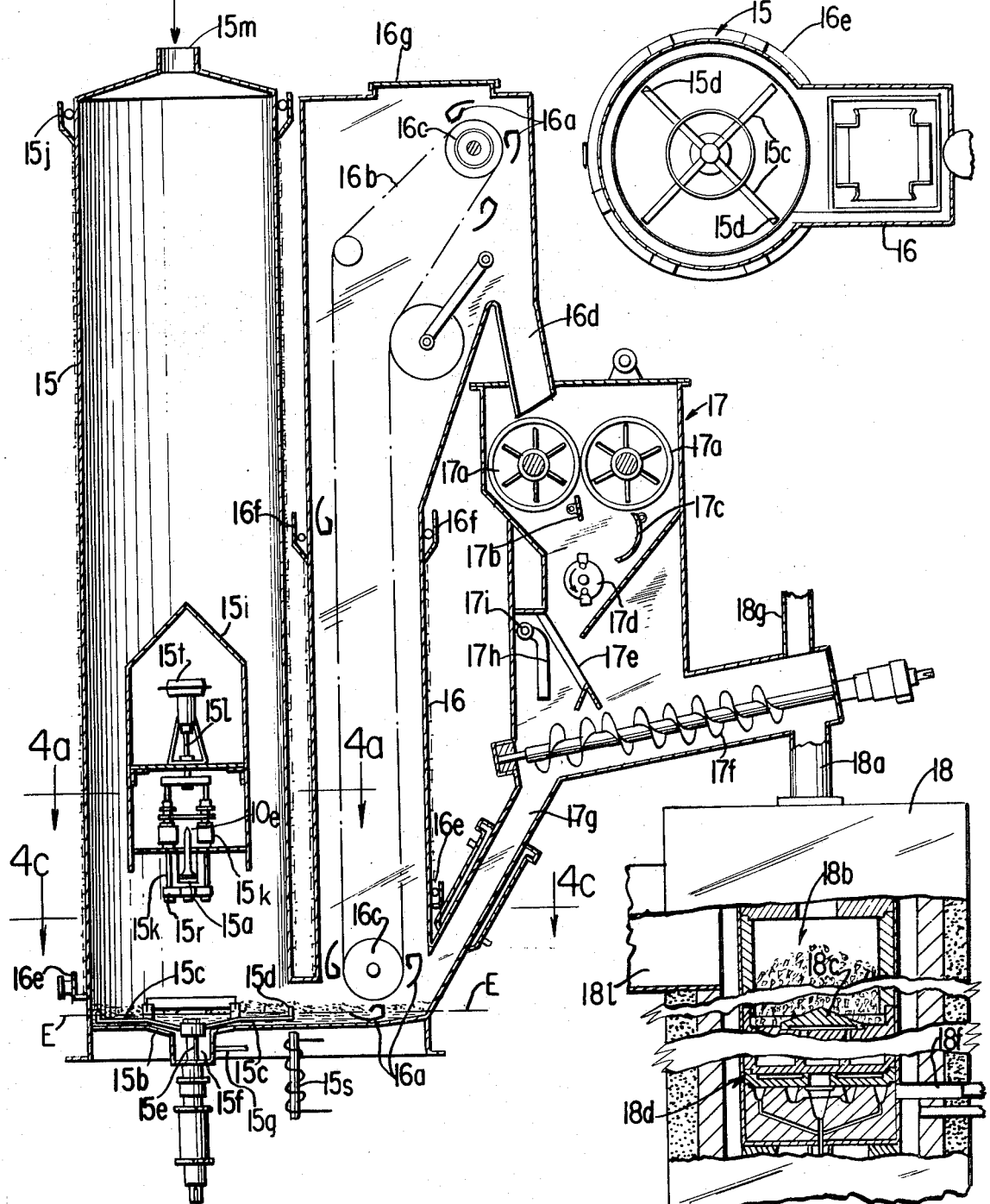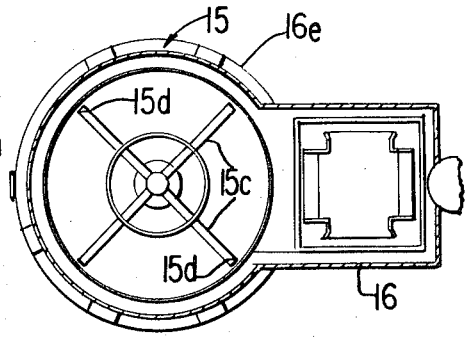

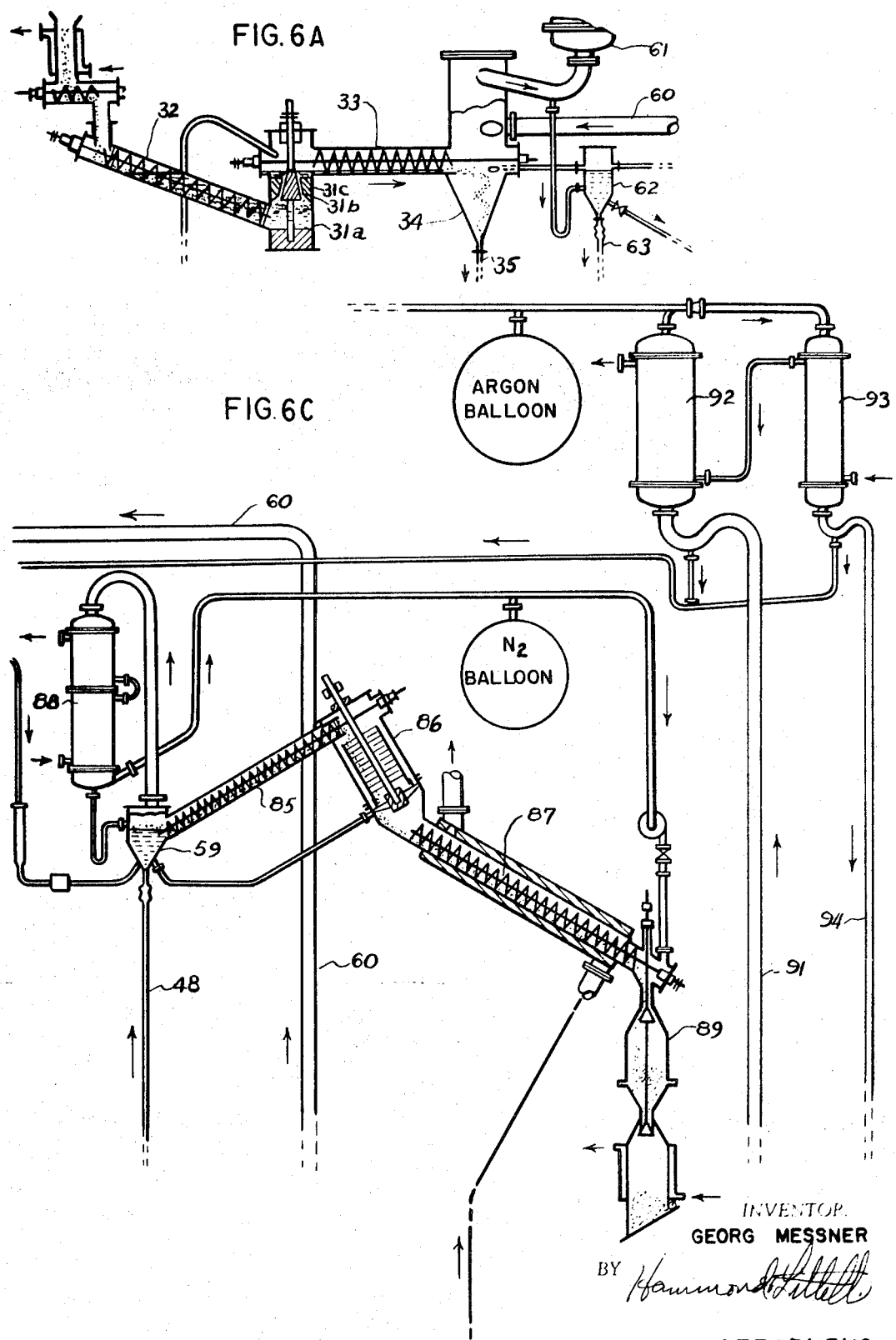

INVENTOR
GEORG MESSNER

ATTORNEYS

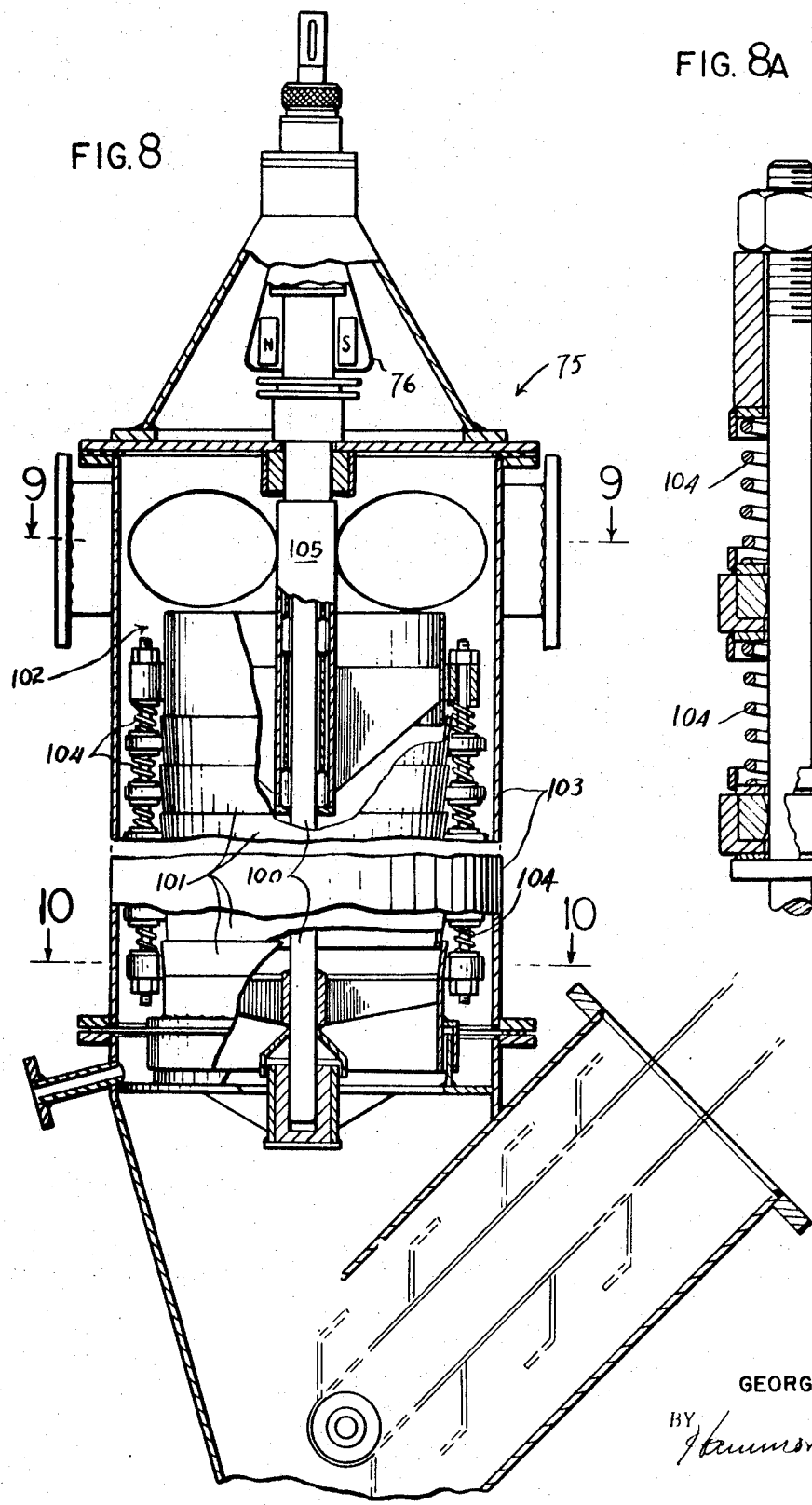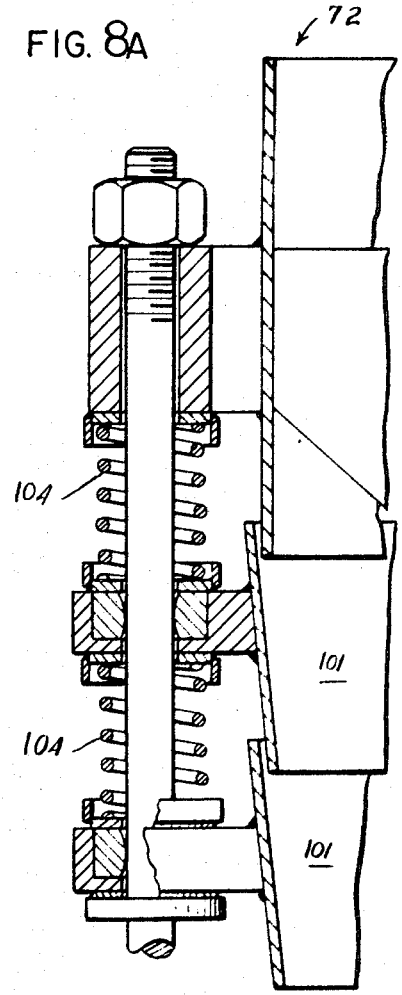

INVENTOR
GEORG MESSNER

BY Hammond & Littell

ATTORNEYS

PROCESS FOR THE EXTRACTION OF ALUMINUM FROM ITS ALLOYS

This application is a continuation-in-part of my copending application Ser. No. 394,873, filed Sept. 8, 1964 and now abandoned.

This invention relates to the production of relatively pure aluminum from alloys of aluminum with elements less soluble than aluminum in mercury, such as alloys and mixtures of aluminum with silicon, titanium, iron, copper, magnesium, zinc, beryllium and other elements. The process is useable for recovering relatively pure aluminum from aluminum scrap and dross as well as from aluminum alloys and mixtures. Relatively pure aluminum as used herein normally means aluminum which analyzes 99.7 percent Al or better, however, producing aluminum with less than 99.7 percent Al is within the scope of my invention.

The process will be described and illustrated with reference to aluminum-silicon alloys, but this is only to illustrate the process which is equally applicable to the recovery of relatively pure aluminum from less pure mixtures and alloys thereof.

Several processes of producing aluminum-silicon and other aluminum alloys are known, such as the carbothermic process in which an alumina-silica ore is reduced by means of a blast furnace techniques to an aluminum-silicon alloy containing from about 60 to 75 percent Al and 25 to 40 percent Si. These alloys are, however, too impure for most commercial uses and they are too brittle to undergo mechanical working and have other objections. They illustrate, however, one source of impure aluminum to which my process is applicable.

One of the objects of my invention is to provide a commercially workable process for recovering relatively pure aluminum from such impure alloys and mixtures, by dissolving the aluminum in mercury and recovering crystallized aluminum of high purity from the aluminum-mercury solution.

Another object of the invention is to provide a method of separating the aluminum-mercury solution at high temperature from the relatively less soluble impurities in the alloy and from the excess mercury, which will be continuous and can be carried out at separation temperatures of about 500° C.

Another object of the invention is to provide a method of separating the aluminum-mercury solution at temperatures above about 450° C. from the less soluble residue in which the aluminum-mercury solution is filtered through, or flows through a bed of the insoluble residue and undissolved aluminum alloy particles.

Another object of the invention is to provide a method of separating the aluminum-mercury solution at temperatures above about 500° C. from the excess mercury and the residue of less soluble impurities in the aluminum alloy in which gravity is used to assist in the separation.

Another object of this invention is to provide a process for the separation of aluminum from other elements in an aluminum alloy mixture by solution of the aluminum in mercury and its subsequent separation therefrom, in which the aluminum alloy mixture is introduced into the mercury at atmospheric pressure, the dissolution of the aluminum in the mercury and the separation of the insoluble residue from the aluminum-mercury solution is effected at superatmospheric pressure of about 11 atmospheres and at temperatures about 500° C., the residue is discharged at atmospheric pressure and the aluminum is crystallized from the mercury at atmospheric pressure.

Various other objects and advantages of my invention will appear as this description proceeds.

Referring now to the drawings which show preferred forms of embodiment of the invention:

FIG. 4 is a sectional view of the aluminum spray crystallizing tower and aluminum recovery portion of the process;

FIG. 4c is a sectional view of the bottom of the crystallizer, along the line 4c–4c of FIG. 4;

FIG. 6a is a detailed view of the alloy and transport mercury feeding portion of the process diagrammatically illustrated in FIG. 6;

FIG. 6c is a detailed view of the residue discharging portion of the process of FIG. 6;

Figure 9:
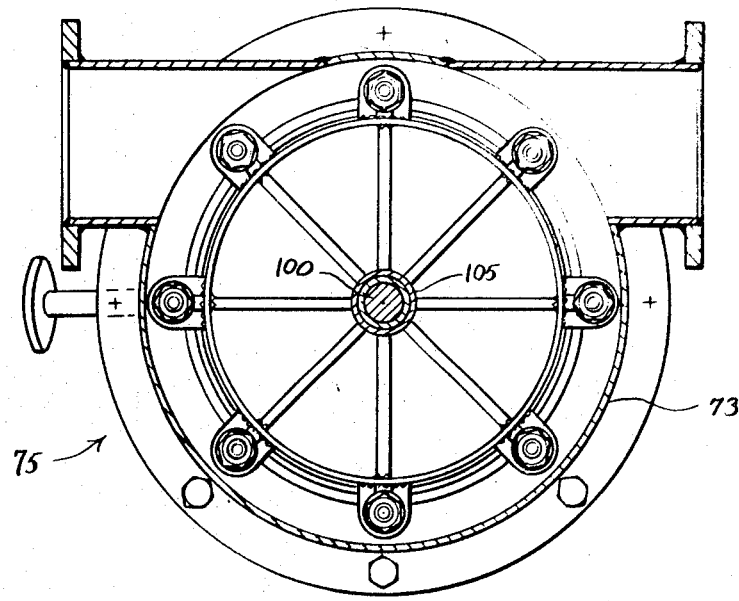
Figure 10:
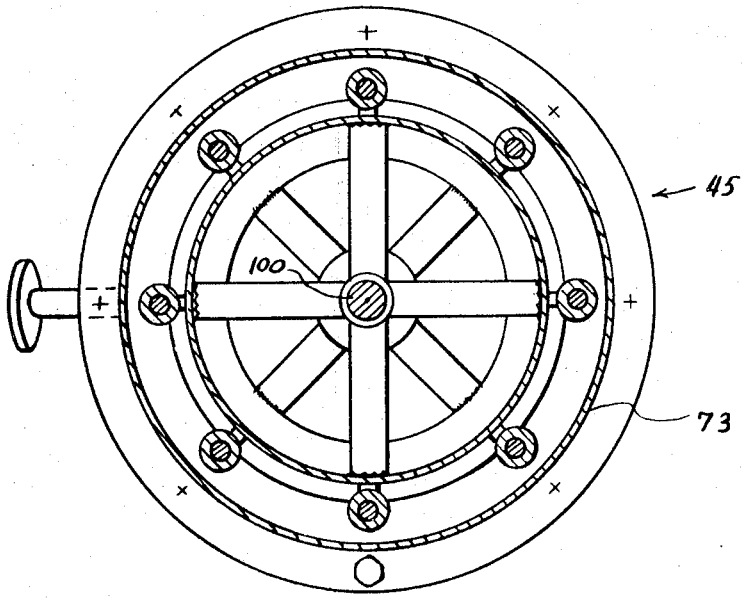

FIGS. 8 and 8a are detailed views of one form of centrifuge for separating the aluminum crystals from the mercury which may be used in the process; and FIGS. 9 and 10 are sectional views along the lines 9—9 and 10—10 of FIG. 8.

MERCURY AND ALLOY FEEDING

In the embodiment of the invention illustrated in FIGS. 1 to 4, the aluminum alloy, aluminum scrap or the like used for the recovery of relatively pure aluminum therefrom is maintained in granular form in supply hopper 1a and charging hopper 1b. The aluminum alloy in granular form is fed by rotating feeder 2 having a revolving disc 2a driven by variable speed motor 2b. The speed of the motor may be automatically or manually controlled to deliver the desired quantity of the alloy into the feed cone 3. The alloy, in particle size of about 3 to 10 mm. diameter, is fed through the discharge chute 1c onto the revolving disc 2a and the speed of the disc 2a controls the rate of alloy feed. Hoppers 1a and 1b may be kept filled by automatically controlled feed mechanisms or by hand control.

Figure 3:
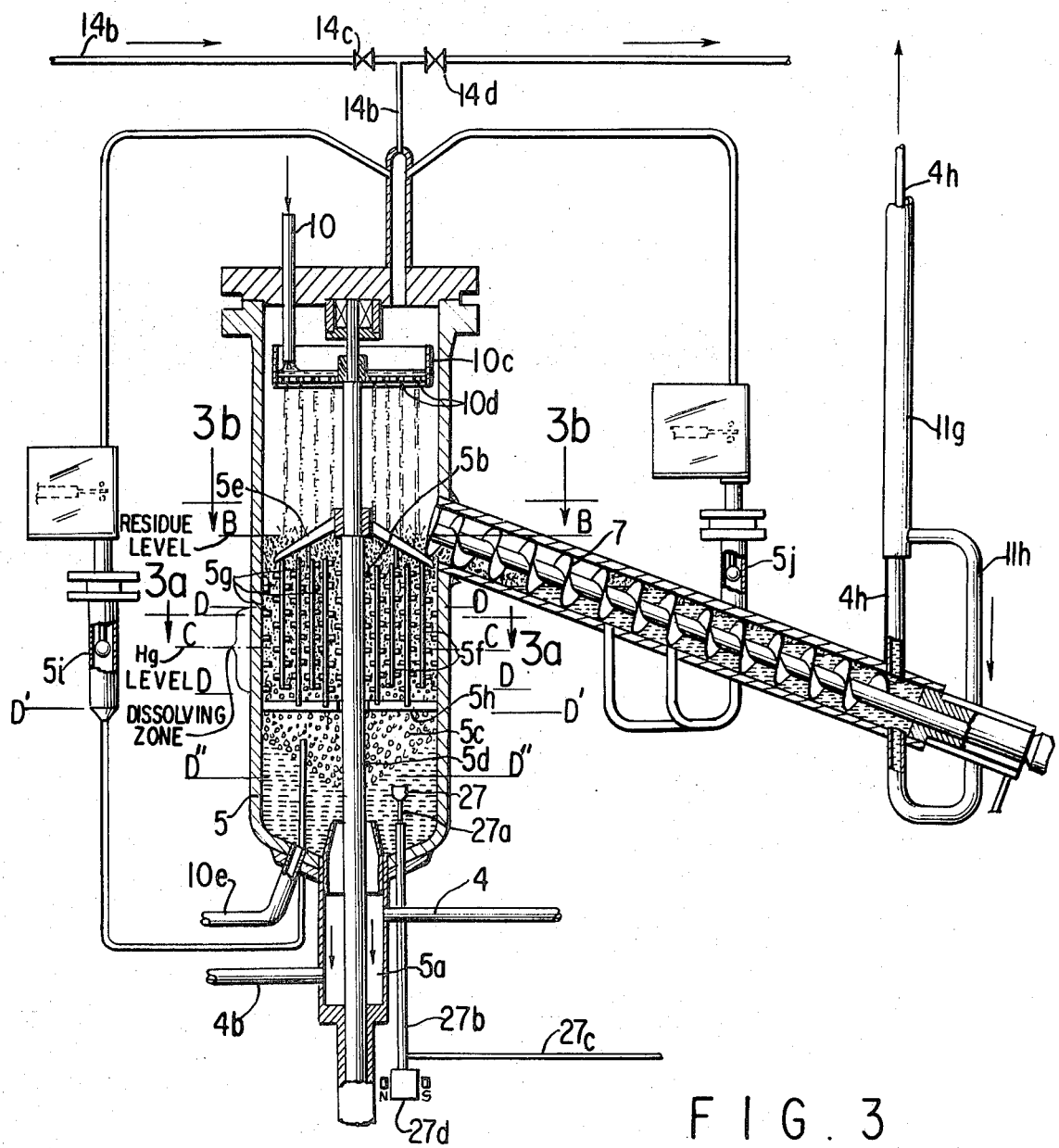
FIG. 3 is a part sectional view on an enlarged scale, of the aluminum dissolving and residue separating portion of the process.
Figure 3A:
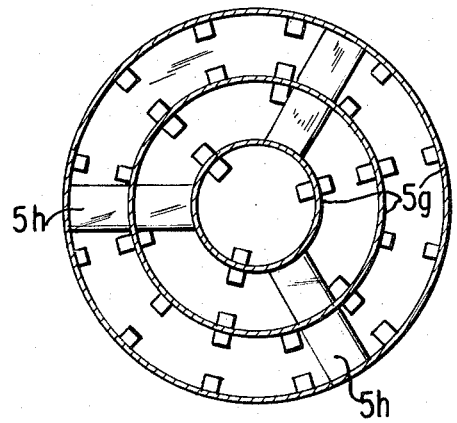
FIG. 3a is a sectional view along the line 3a—3a of FIG. 3.
Figure 3B:
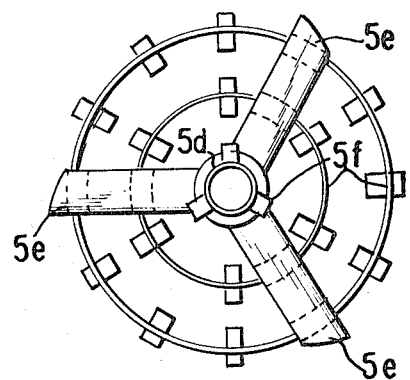
FIG. 3b is a sectional view along the line 3b—3b of FIG. 3.
Figure 4A:
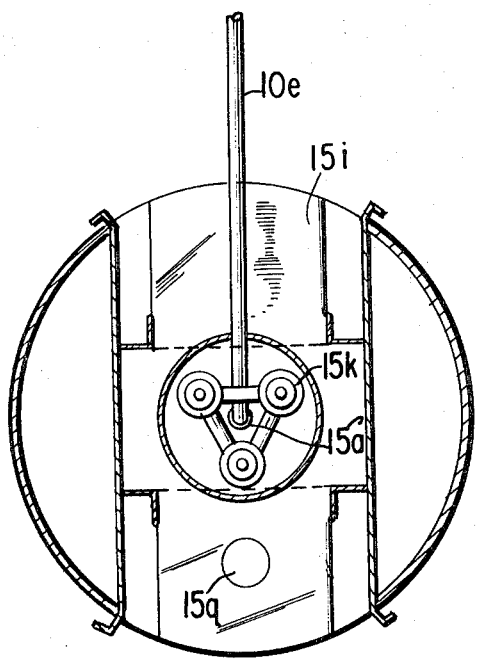
FIG. 4a is a sectional view along the line 4a—4a of FIG. 4.
Figure 4B:
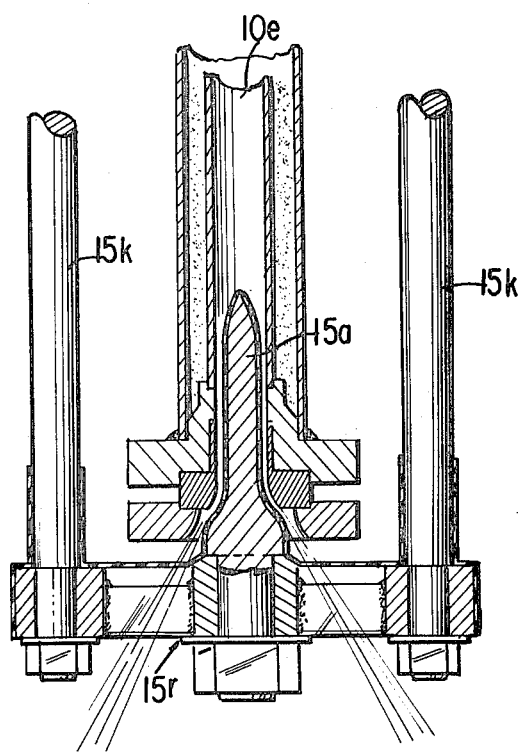
FIG. 4b is a part sectional view of the aluminum mercury spray nozzle.

Mercury at substantially atmospheric pressure and about 360° C. is delivered into the top of the feed cone 3 through the line 3a. As this is slightly above the boiling point of mercury at atmospheric pressure a part of the mercury is vaporized in the feed cone 3 and the vapor flows through the line 3b into a water-cooled condenser 3c, from which the condensed mercury is fed by line 3b back to feed cone 3. An expandable nitrogen cylinder or balloon 3f which can expand and contract with changes of pressure in condenser 3c maintains a nitrogen atmosphere on the mercury vapors in feed cone 3 and in other parts of the process. As the mercury flowing through the line 3a is recycled transport mercury returning from the process, it will normally contain about 280 kg./hr. of aluminum dissolved in 60,000 kg./hr. of mercury, about 0.38 weight percent. The abbreviation kg./hr. means kilograms per hour. In the feeding cone 3, an aluminum-silicon alloy, for example, 75 percent Al and 25 percent Si, at about 20° C. is fed into the recycling mercury stream at the rate of about 590 kg./hr. and this mixture flows through the transport tube 4 into the bottom of an aluminum dissolving and separating vessel 5 (FIG. 3).

During the passage through the transport tube 4, the aluminum-silicon-mercury mixture which has been cooled by the addition of the colder alloy particles into the hot carrier mercury stream, is heated to a temperature of about 357° C., by heating the transport tube 4 by means of heat exchangers 4a fed with molten salt at about 450° C. from the line 20e.

The aluminum-silicon alloy mercury mixture passing through the transport tube 4 enters an enlarged dissolving and separating vessel 5 through a decanting cylinder 5a and into the bottom of the dissolving and separating vessel 5, which is elongated along its vertical axis to promote better dissolving of the aluminum in mercury and better separation of the undissolved silicon residue from the aluminum-mercury solution and better separation of the aluminum-mercury solution. In the decanting cylinder 5a, the AlSi alloy particles suspended in mercury pass upwardly into the dissolving and separating vessel 5 and the transport mercury substantially free of solid particles flows downwardly as indicated by the arrows into the recycle transport mercury tube 4b and then to the pump 8 and then through the line 3a to the feed cone 3. The recycle transport mercury flow and the feeding of the AlSi alloy particles by the rotating feeder 2 are regulatable and are kept in proper balance to feed the correct amount of mercury and alloy into the dissolving and separating vessel 5.

ALUMINUM DISSOLVING AND IMPURITY SEPARATING

In the dissolving and separating vessel 5, dissolving mercury, heated to about 520° C., is introduced through the line 10 after passing through a molten salt heat exchanger 10a and gas-heated coil 10b. The hot dissolving mercury is introduced onto a rotating pan 10c, having perforations 10d, from which it is distributed across the entire diameter of dissolving vessel 5 and then flows downwardly through the slowly rising residue particles 5b and the AlSi particles 5c and the stream of mercury carrying about 2.1 percent weight/percent of dissolved aluminum therein, flows out of the dissolver 5 at a temperature of about 485° C., and a pressure in excess of 10 atm. through the line 10e to the aluminum spray crystallizer or condenser 15. The approximate location of the Al dissolving zone in vessel 5 is indicated as between the lines D—D and D'—D'. Above the line D—D the silicon residue particles in the zone 5b provide a filtering effect on any AlHg solution escaping into the residue zone and between the lines D'—D' and the lines D''—D'' the AlSi particles in the zone 5c provide a filtering effect on the AlHg solution flowing toward the outlet 10e as is later described.

Figure 5:
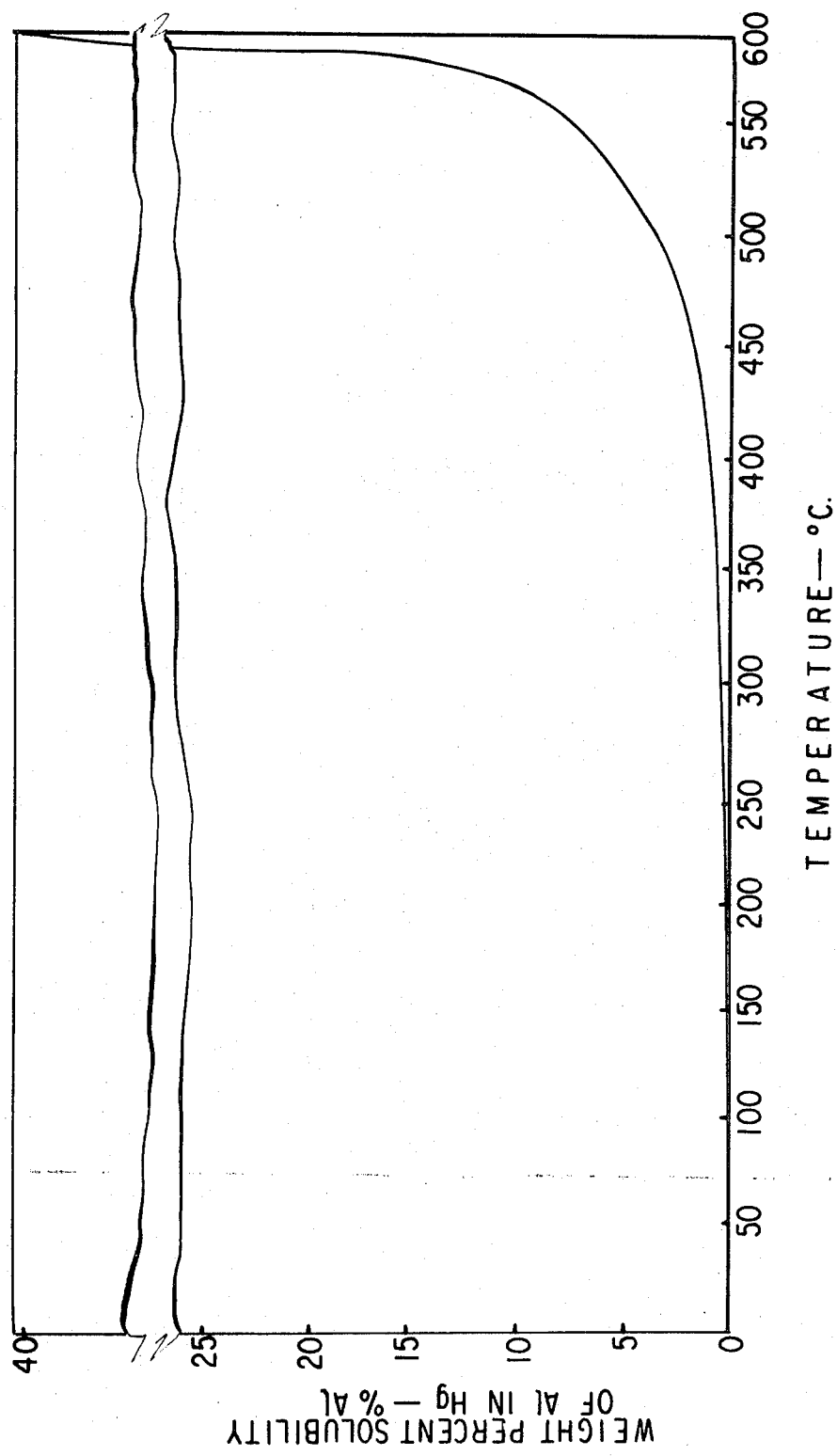
FIG. 5 is a solubility diagram of aluminum in mercury at various temperatures.

FIG. 5 shows a portion of the solubility diagram of weight percent of aluminum soluble in mercury at different temperatures, from which it will be seen that the weight percent solubility of aluminum in mercury rises rapidly as the temperature rises. However, as the boiling point of mercury is about 360° C., a pressure substantially in excess of 10 atm. must be maintained in the dissolving and separating vessel 5 if the mercury temperature is to be maintained at about 520° to 600° C. The mercury temperature may be higher or lower than the described range of 520° to 600° C. but practical operating conditions, when considered with strength of materials and yields of pure aluminum, make this range preferable.

The weight percent solubility of aluminum in mercury at different temperatures and the corresponding pressure is approximately as follows:

| °C. | Weight % Al In Solution | Pressure mm. Hg |
| --- | --- | --- |
| 360 | 0.450 | 806 appr. boiling point |
| 520 | appr. 4.2 | 7,691.00 |
| 550 | appr. 7 | 10,650.00 |
| 600 | appr. 40 | 22.87 atm. |

At about 530° C., the pressure in vessel 5 is in excess of 11 atmospheres and the height of the column 4 for feeding transport mercury and the suspended alloy into dissolving vessel 5, and the column 4h conveying the residue for discharge at atmospheric pressure must be sufficient to maintain the required pressure in the dissolving and separating vessel 5. This, for example, requires a height of about 19 meters when the pressure in the vessel 5 is 22.8 atmospheres and the temperature about 600° C. At this temperature the AlHg solution will contain about 40 weight percent of aluminum dissolved therein.

In the vessel 5, the aluminum in the alloy is dissolved in mercury in the weight percent indicated by the above table and diagram, at the design temperature of the dissolving mercury in vessel 5. The approximate upper level of the residue zone is indicated by the line B—B, the approximate upper level of the mercury is indicated by the line C—C and the approximate dissolving zone is between the lines D—D and D'—D'. The exact location of these zones will vary, depending on variations in operating conditions. The mercury solution after filtering through the residue solids bed 5b and the Al dissolving zone D—D' flows through the filtration bed of AlSi particles between the lines D'—D' and D''—D'' and out through the line 10e to the aluminum recovery system described below. The fine silicon and other residue impurities, less soluble in the mercury than aluminum, rise largely by gravity and by the operation of paddles on the cylinders 5f and 5g to the level of screw conveyor 7 in vessel 5 and are discharged through the line 4h in which mercury carrying the solid residue flows upward into the residue separating box 11 in which the solid residue is separated from the mercury and discharged from the process at atmospheric pressure and the mercury returned to the bottom of column 4h by means of pump 8b.

The dissolving vessel 5 is a stationary cylinder with its axis vertical. It contains a rotating shaft 5d driven from below, which rotates the pan 10c. Arms 5e mounted on the shaft 5d at about the level of the entrance to screw conveyor 7 are connected to two of the rotating paddle cylinders 5f. The center paddles are mounted directly on the shaft 5d and rotate with this shaft. The arms 5e also serve to stir the residue particles 5b and to feed them toward the upper end of screw conveyor 7. The rotating paddle cylinders 5f rotate between a set of three stationary paddle cylinders 5g, mounted on the walls of vessel 5. The stationary cylinders are mounted on supporting arms 5h extending inwardly from the walls of vessel 5 at the bottom of the stationary cylinders 5g. The paddles on the cylinders 5f and 5g are sloped to produce a mechanical lifting effect on the residue particles 5b in the upper portion of the dissolver 5 and the rotation of the movable paddle cylinders prevents packing of the residue particles so that the hot extraction mercury stream falling downward from the rotating mercury pan 10c can flow through the rising residue particles 5b to wash out any of the HgAl solution escaping into the filtering layer of silicon residue particles on the top of the AlHg solution. The mercury level is maintained at about the line C—C and the solid AlSi particles rising in the cylinder 5 have most of the aluminum dissolved in the mercury before reaching the line C—C.

Presence of the filtering layer 5c, composed of new AlSi feed grains immediately underneath the stationary paddle cylinder arrangement 5g, eliminates all fines from the downward flowing HgAl stream and carries these fines back into the upper part of the dissolving zone as the filtering and residue layer moves upwards in the dissolver.

It is important that this filtering AlSi feed layer is not disturbed by any mechanical means, so that the particles of fines sticking to the coarse AlSi particles are not taken away from the latter. For this purpose, no stirring device is provided in this zone. As the particles of the filtering layer are fairly large, they are able to enter the spaces inside the paddle cylinder arrangement just by their buoyancy.

The connection of fine residue particles eventually sticking to the new AlSi feed material of the filtering layer is not disturbed by the Al leaching from he particles of this layer, because such Al leaching cannot take place as explained hereafter.

The dissolution mercury enters the upper part of the dissolver 5 with a temperature of about 520° C. and leaves the lower part of the dissolver at about 485° C.

The Al saturation at 520° C. is about 4 percent Al by weight. The 520° C. Hg reaches 60 percent of its Al saturation value, i.e., 2.4 percent Al are dissolved. The Al saturation at 485° C. is about 2.1 percent Al.

The dissolution speed is much higher at 520° C. than at 485° C.

As the HgAl solution flows downwards through the AlSi bed, it becomes cooler, due to the fact that the AlSi feed enters through the line 4 at about 357° C. By the proper adjustment of AlSi feed quantity and dissolution Hg quantity in the lowest part of the AlSi feed packing, in the not agitated AlSi filtration bed, some Al is deposited on the surface of its particles. So, in the zone of the AlSi filtration bed, there is no Al dissolution, on the contrary, there is at least a slight Al deposition on the AlSi surfaces, due to the above indicated Al concentrations. This Al deposited on the AlSi particles will later on, when these Al grains have reached higher levels of the AlSi packing, be redissolved in the downwards flowing HgAl solution, which has a higher temperature.

The upper part of the dissolver is maintained full of pressurized nitrogen from the line 14b. The hot Hg at 520° C. is distributed over the whole cross section of the dissolver by the rotating pan 10c with a perforated bottom plate, assembled to and rotating with the axle 5d.

A float 27, inside the dissolving and separating vessel 5 is connected by a steel rod 27a to an external gauge (not shown) which is energized electromagnetically, to show changes in the thickness of the AlSi filter bed 5c in the vessel 5. The rate of feed of the AlSi alloy by the feeder 2 can be changed by manual or automatic controls in accordance with the readings of this gauge to decrease or decrease the rate of AlSi alloy feed. The rod 27a extends downwardly through the tube 27b. The electromagnetic drive for the rod 27a is indicated at 27d. High-pressure mercury from the line 27c prevents mercury outflow from the tube 27b.

RESIDUE SEPARATOR

Figure 1:
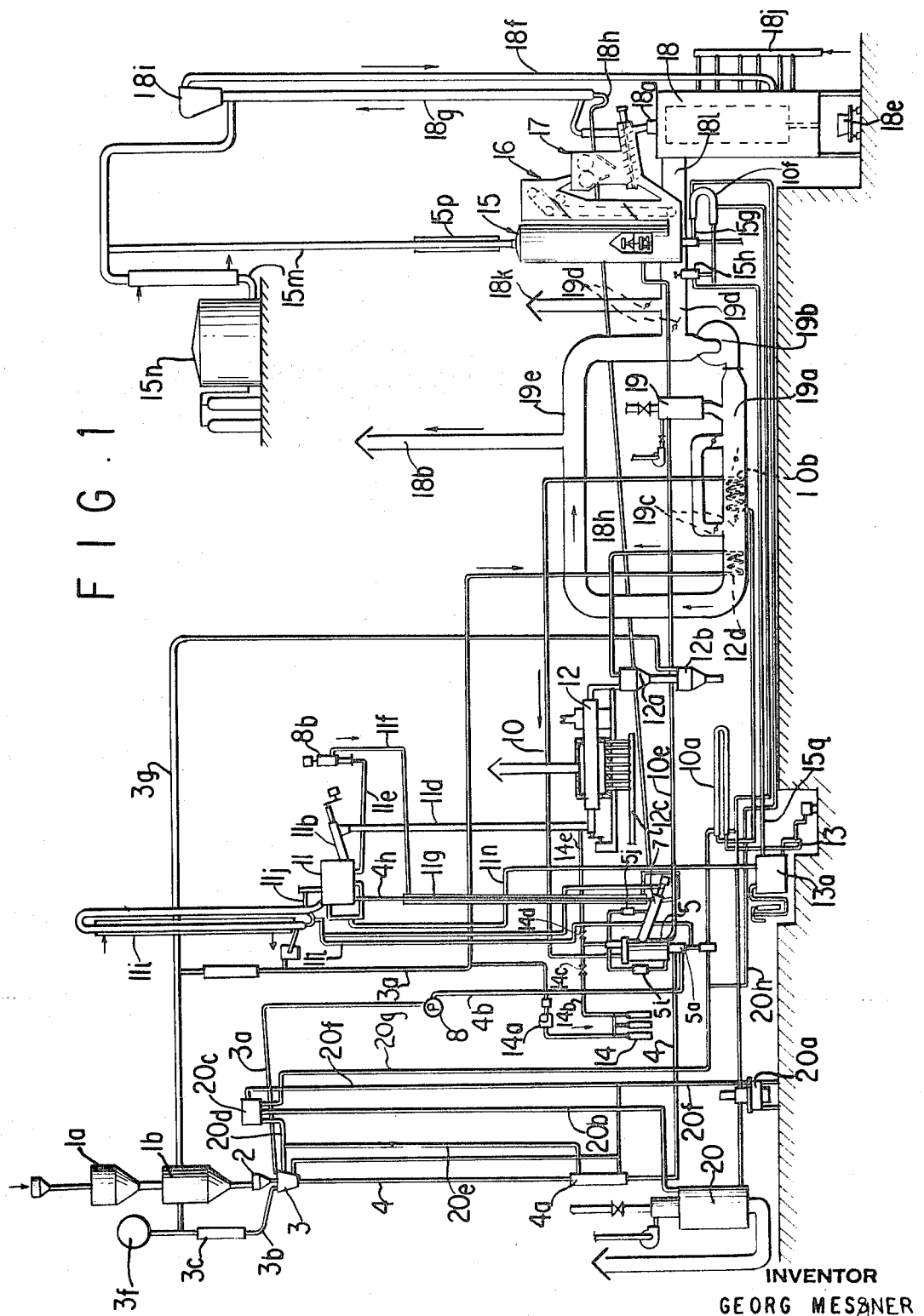
FIG. 1 is a diagrammatic flow sheet illustrating a preferred method of practicing the process.
Figure 2:
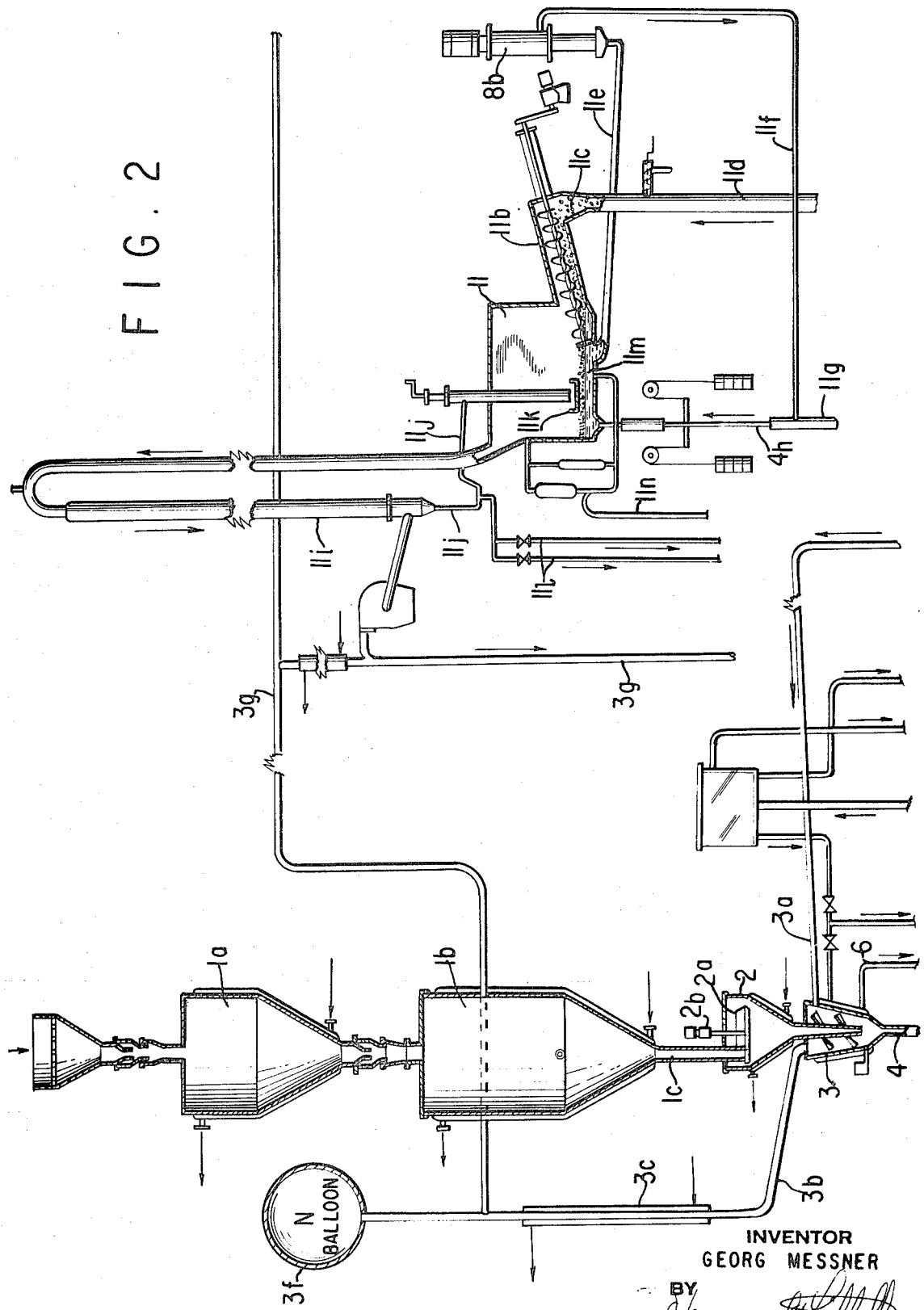
FIG. 2 is a part sectional view on an enlarged scale, of the alloy feeding and residue recovery portion of the process.

In the residue separator 11 (FIG. 2), the residue at atmospheric pressure entering from the line 4h, separates from and floats on a pool of mercury 11m, from which it is skimmed off by the screw conveyor 11b and deposited in the throat 11c of the line 11d leading to the residue dryers 12 (FIG. 1). Mercury from the pool 11m flows through the line 11e to the pump 8b and then through the line 11f to the heat exchange jacket 11g surrounding line 4h. From the bottom of jacket 11g, the mercury flows through the loop 11h and into the jacket of screw conveyor 7 and then into the bottom of line 4h where its pressure (from pump 8b and the internal pressure of dissolver 5) assists in conveying the residue particles upward into the separator 11. A mercury condenser 11i receives mercury vapor from residue separator 11 and after condensing it returns the condensed mercury to the separator 11 through the line 11j where it overflows from the pan 11k to wash the residue particles with mercury. Mercury condensate from the condenser 11i is also fed through the lines 11-1 to the bearing of the shaft of screw conveyor 7 and of shaft 5d of dissolving vessel 5. An emergency overflow line 11n carries excess mercury condensate back to pump tank 13a of pump 13 which recirculates mercury through the heat exchange coils 10a and 10b and line 10 and back to the dissolving vessel 5. The mercury level in dissolving vessel 5 and in the screw conveyor jacket 7 is automatically controlled by level gauges 5i and 5j.

The mercury and mercury vapor in condenser 11i, hopper 1b, feed cone 3, dryer 12, etc. is kept under a nitrogen protective atmosphere by a nitrogen balloon or a telescoping nitrogen cylinder 3f. Nitrogen from this source is compressed by compressor 14a and stored in nitrogen bottles 14 for maintaining the nitrogen pressure in dissolver 5. Nitrogen in the balloon 3f is at about 100 mm. water pressure above atmospheric.

In the residue dryer 12, the solid residue still containing mercury adhering thereto is moved in thin layers through the dryer by screw conveyors, or otherwise, while being heated to a temperature of about 700° C. to vaporize the mercury therefrom. The mercury vaporized from the residue passes upward through the tube 11d, countercurrent to the descending residue particles, into the residue separator 11 and through the condenser 11i where it is condensed and returned as described. The solid residue from the dryer 12 is discharged through discharge cones 12a and 12b which are sealed against the entrance of air therein by means, for example, of nitrogen flowing through line 3g leading from the nitrogen source 3f.

ALUMINUM RECOVERY

The AlHg solution flowing through line 10e flows to a water-cooled mercury condenser or crystallizer 15 (FIGS. 1 and 4) where it is sprayed by an automatically controlled needle spray valve 15a, into the bottom of condenser 15 at about atmospheric pressure, where the rapid vaporization of the mercury quickly cools the solution and causes the aluminum to crystallize in the slightly conical bottom 15b of condenser 15. The bottom 15b a pool of mercury on top of which the aluminum crystals deposit and float. Four arms 15c carrying cutter blades 15d are rotated by a shaft 15e to keep the bed of aluminum crystals in motion. The cutters 15d keep the crystals from sticking to the walls of a crystallizer 15 and help move the aluminum crystals into the bottom of a bucket elevator 16 having buckets 16a which pick up the crystals and deposit them into a roller press 17 having rolls 17a between which the crystals are deposited and squeezed free of most of the adhering mercury. The approximate level of the mercury pool in the bottom of condenser 15 and bucket elevator 16 is indicated by the line E—E. The excess mercury flows into sump 15f and out of line 15g through a level regulator 15h(FIG. 1) and back to pump tank 13a. An electromagnet 15s imparts a flexing motion to arms 15c as they pass over the magnet. The walls of condenser 15 are cooled by a stream of water flowing down the walls from water inlet 15j.

The aluminum crystals forming a layer of 3 to 4 cm. thick floating on the top of the mercury pool in the bottom of the bucket elevator 16 are picked up by buckets 16a mounted on belts 16b moving around pulleys 16c and dropped into the throat 16d leading to the roller press 17. The walls of elevator 16 are water cooled by water conduits 16f. A trough 16e receives the water running down the walls of crystallizer 15 and elevator 16.

The spray nozzle 15a is located in a tunnel 15i passing through the crystallizer tower 15, and is mounted on base 15r secured to three vertically movable rods 15k controlled by an elevating rod 15-1 which may be raised and lowered by motor 15t to reduce or increase the size of the orifice in the nozzle 15a. A sight glass 15q permits inspection of the inside of crystallizer 15 and a sight glass 16g permits inspection of the bucket elevator 16. The nozzle 15a sprays the AlHg solution at about 485° C. and about 10 atm. pressure flowing from the line 10e directly downward into the center of crystallizer 15 which operates at atmospheric pressure.

During the crystallization and melting of the aluminum crystals, oxidation is prevented by filling this portion of the apparatus (crystallizer 15, bucket elevator 16 and melting furnace 18) with argon from an expanding and contracting argon balloon or telescoping gas holders, 15n. The constancy of the atmospheric pressure is guaranteed by a connection 15m with the expansible gas holder 15n for argon or other inert gas. A condenser 15p in the connection 15m assures that any mercury vapor escaping from the crystallizer 15, etc. will be condensed and returned to the crystallizer.

The AlHg solution drops, after their release through spray valve 15a, start violent boiling until their temperature has reached the Hg boiling point at atmospheric pressure. This boiling point is slightly higher than the normal boiling point of Hg, 357° C., due to the presence of some dissolved Al in the Hg mother liquid.

The sprayed HgAl solution offers a large surface area to the gas atmosphere in the crystallizer and it cools very quickly, the drops of this supersaturated AlHg solution are thrown with a high speed towards the surface of the AlHg pool at the bottom of a two meter wide crystallizer tower where the Al crystallizes and forms a floating layer of aluminum crystals on the top of the mercury pool in the bottom of the crystallizer. The crystallizer 15 is cooled on the sides by water from jackets 15j which flow a stream of water down the sides of the crystallizer into the collecting trough 16e.

In the roller press 17 the aluminum crystals are rolled or squeezed between rollers 17a which are grooved to form the aluminum into bars, and have holes to permit the mercury squeezed from the aluminum to pass to the inside of the rollers where it flows to the bottom of the elevator 16. The aluminum is dropped onto an adjustable deflector blade 17b. A scraper 17c prevents the aluminum from sticking to the rollers 17a and a rotating breaker 17d with two hammers deflects the bars against a screen 17e which deflects the larger bars into the right end of screw conveyor 17f by which they are conveyed into he melting furnace 18. The flights at the left end of screw conveyor 17f are pitched in the opposite direction, as shown by the drawings, and convey the aluminum fines and any liquid mercury into the water-cooled chute 17g where they are turned to the aluminum crystal and mercury pool in the bottom of crystallizer 15 and elevator 16. A comb-type cleaner 17h is mounted on a rod 17i for periodically cleaning the slots in the screen 17e.

THE ALUMINUM MELTING FURNACE

The screw conveyor 17f drops the aluminum bars and bigger pieces of aluminum into the throat 18a of a graphite lined aluminum melting furnace 18. At this point, the bars contain about 27 percent Al and 73 percent Hg by weight, which corresponds to 65 percent Al and 35 percent Hg by volume. The pressed amalgam bars rest on the top of a large mass or pile 18b of the AlHg amalgam which is not yet molten but still in the "drying" or mercury elimination phase. The mass or pile 18b rests on the top of a thick sloping graphite plate 18c which covers a series of channeled graphite vexation plates 18d. As the aluminum toward the bottom of pile 18b is melted, the molten aluminum flows in cascade fashion through the channels in vexation plates 18d to the bottom of the furnace and thence into the ladle 18e. Argon or other inert gas is introduced into the bottom of furnace 18 through the line 18f and floods the furnace with inert gas. The inert argon gas has several functions, namely: (a) to protect the graphite lining of the furnace and the Al and the Hg from oxidation; (b) to participate in heat transfer by convection between steel shield and graphite cylinders as well as between the hot graphite cylinders and the Al amalgam and the remaining demercurized Al mass; (c) to carry away the specifically heave Hg vapors formed in the furnace, especially to keep them from flowing down into the lowest part of the furnace, where the last traces of Hg, still dissolved in the molten Al, have to be taken away, in order to produce a Hg free Al metal. For this purpose, he argon is introduced on the lower part of the furnace and flows upwards in countercurrent to the aluminum and is discharged through the Al amalgam feed throat 18a. The solid Al amalgam accumulated in the upper part of the furnace is gradually heated up from its original temperature of about 300°–350° C. to the boiling temperature of Hg under atmospheric pressure (about 360° C.). The solid pieces of Al amalgam are slowly transformed into a solid mass with a structure like coke made from fossil coal, because while the external shape of the original amalgam pieces is maintained, the 35 vol. percent of Hg are distilled off and the corresponding holes and pores are preserved in the remaining pieces.

Argon gas flows into the bottom of furnace 18 through the line 18f and blankets the molten aluminum and the aluminum particles in the furnace. The argon gas and mercury vaporized in furnace 18 pass upward through the throat 18a into a water-cooled condenser loop 18g wherein the mercury is condensed and returned to the process through the line 18h and the argon, freed of mercury, is returned by the blower 18i to the bottom of the furnace 18.

The evaporation of the Hg from an amalgam piece proceeds with the dwelling time of the piece in the furnace. The lowest Hg content of the solid amalgam occurs in the Al "coke" pieces close to the thick graphite plate 18c. Any additional heat supplied to these Hg poor Al "coke" pieces results in melting them, the formed liquid Al flows downwards and releases, as vapor, the last few percent of Hg, incorporated in the solid Al crystals.

Flowing downwards through the several cascades of graphite vexation plates, the liquid aluminum loses practically all its dissolved Hg due to the countercurrent flow of Hg free argon gas, which keeps the partial pressure of the Hg in the vexation zone low.

Due to the continuous melting of the lower part of the solid Al "coke" pieces, the Al amalgam bricks or packing in the upper part of the furnace moves slowly downwards and is continuously and gradually demercurized on its way.

Heat is supplied by the burners 18j, fed by a mixture of air and hydrocarbon gas, and the combustion gas is either circulated through the gas heating system or vented through the stack 18k by way of passage 18-1.

THE HEATING SYSTEM

Heat is supplied by a gas or oil-fired burner 19 which feeds hot combustion gases at about 1,500° C. into the combustion gas-circulating line 19a through which the combustion gas is circulated by blower 19b past the mercury-heating coil 10b. Residue dryers 12 are heated by separate gas burners 12c. The heat is controlled by butterfly valves 19c and 19d which may be thermostatically controlled and interlocked. The hot gases are recirculated through the loop 19e. The nitrogen flowing into the residue discharge 12a is heated by a coil 12d in the heating line 19a.

THE FUSED SALT HEATING SYSTEM

The fused salt for the several fused salt heat exchangers is heated in a gas-fired furnace 20 and is pumped by pump 20a through the furnace 20 and the line 20b to a fused salt reservoir 20c. It is distributed by the line 20d to the jacket of feed cone 3 and by the line 20e to the heat exchanger 4a and back to pump 20a through the line 20f. Excess molten salt also flows back to pump 20a from reservoir 20c through line 20f. From reservoir 20c fused salt flows through line 20g to heat exchanger 10a for preheating the mercury to about 470° C. before the mercury goes through heating coil 10b to be heated to about 520° C. before it enters the dissolver 5 through the line 10. From the line 20g, the molten salt also flows through the line 20h to the heat exchanger 10f where it heats the mercury flowing out of crystallizer 15. From the heat exchangers 10a and 10f the molten salt flows back to pump 20a.

To prevent oxidation of mercury, a nitrogen atmosphere, at slightly in excess of atmospheric pressure, is maintained by the nitrogen balloon (or a nitrogen gas tank) 3f over the mercury surfaces or mercury vapor in the alloy charging vessels 1a and 1b, feeder 2, feed cone 3, residue discharge reservoir 11, dryer 12, residue discharge cones 12a and 12b and in other portions of the apparatus where mercury or mercury vapors would otherwise be exposed to air. In dissolving vessel 5, the nitrogen atmosphere above the mercury level is maintained at about 19 atm. pressure by the nitrogen compressor 14a which compresses the nitrogen to 19 atm. pressure and stores it in nitrogen bottles 14. From the bottles 14, the compressed nitrogen flows through the line 14b to the dissolver 5. An automatic pressure control valve 14c controls the pressure of the nitrogen entering the dissolver 5 and an automatic pressure relief valve 14d in the line 14e vents the nitrogen from the dissolver 5 through the line 14e leading to dryer 12 when the nitrogen pressure in dissolver 5 exceeds the designed pressure.

OTHER EMBODIMENTS

Figure 6:
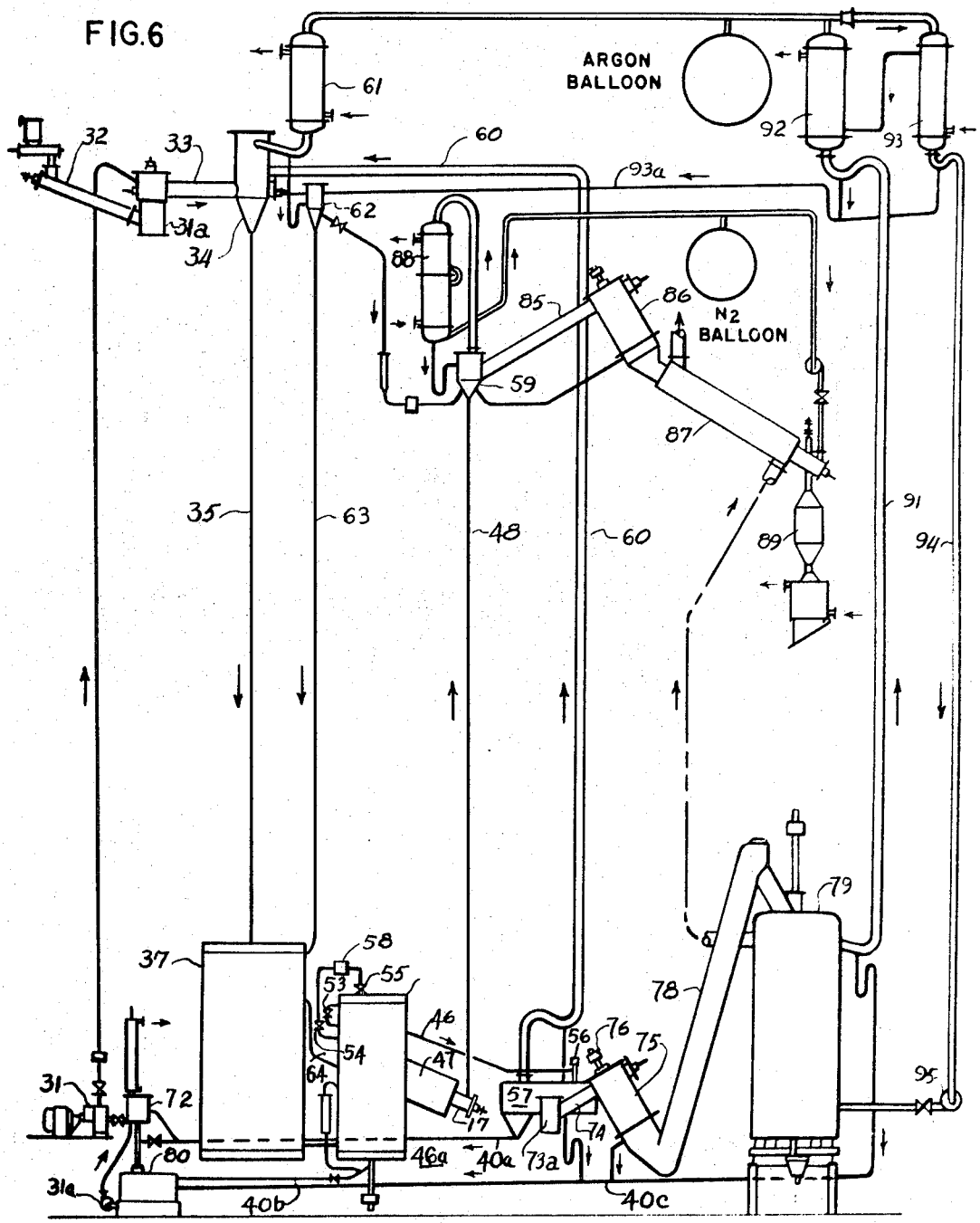
FIG. 6 is an alternative form of flow sheet for the process, similar to FIG. 1 of my prior application, Ser. No. 394,873.
Figure 6B:
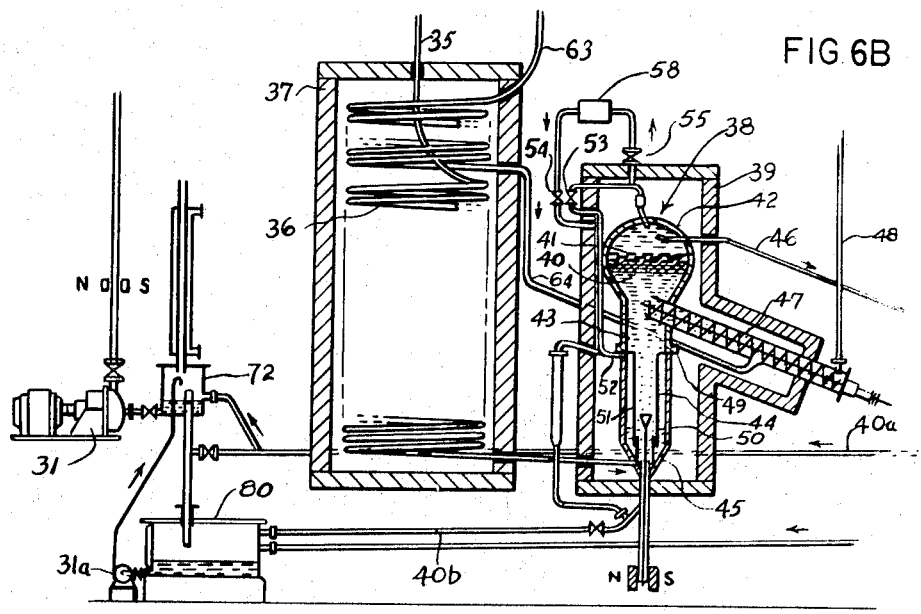
FIG. 6b is a detailed view of the aluminum dissolving and residue separating portion of the process illustrated in FIG. 6.

In the embodiment of the invention illustrated in FIGS. 6, 6A and 6B, an AlSi alloy having about 60 percent by weight of aluminum and 40 percent silicon is fed into a circulating hot mercury transport stream pumped by pump 31 into the grinding mill 31a. The ingots of the AlSi alloy may first be broken into pieces about 30–50 mm. average cross section and fed at room or elevated temperature into the transport mercury stream.

These pieces of about 30-50 mm. as well as all the smaller particles produced in the crusher are then fed into an inclined screw conveyor 32 which carries them into the lower part of grinding mill 31a filled with hot mercury. The AlSi pieces, due to direct contact with the hot mercury, are rapidly heated up to the desired temperature of approximately 200° to 350° C. and enter the conically shaped space 31b between the grinding members 31c where they are crushed. The new surfaces of the AlSi alloy created by the action of the mill immediately are wetted with mercury in a manner known per se. Corresponding to the smaller dimensions of the ground AlSi pieces, they can pass the wedge-shaped free space 31b of the grinding mill 31a, floating upwards in the mercury. Upon arrival of the Hg surface above the grinding member 31c, they leave the mill through a nearly horizontal screw conveyor 33, floating on the mercury surface, and enter the mixing cone 34 where they are entrained into the vertical transport tube 35, together with the required amount of liquid mercury at about 357° C. If the particles are less than 6 mm. average cross section, the grinding mill 31a may be omitted and the particles of alloy added directly into the mixing cone 34.

A certain minimum speed of the mixture must be maintained, otherwise the transport and charging tube 35 becomes clogged by the solid particles. This minimum linear speed depends upon the size of the biggest particles of the Al alloy and upon the diameter of the tube, and has been established as substantially 50-100 cm. per second.

FIG. 6B shows the charging tube 35 in the form of a coil 36 at its lower end, which is disposed in a gas- or oil-fired furnace 37. While the extraction mixture passes the first part of this coil, it is heated up to the final extraction temperature, for instance, to 530° C.

I have found that it is possible to accomplish the dissolution of nearly all soluble Al in the transport and charging tube, if this tube is long enough, i.e., if the retention time of the extraction mixture in the transport charging tube is long enough, and if a sufficient amount of mercury is present. This gives a great technical and economical advantage because this transport and charging tube is the cheapest type of equipment for a reaction under pressure at high temperature. However, it is possible to use the charging tube 35 and coil 36 only as a transport and charging tube and to heat the mercury-aluminum mixture to the desired dissolution temperature in the dissolving and separating vessel 38 as will be described later and illustrated in example 4.

When the highest extraction temperature has been attained, for instance, 530° C., dissolution of Al from the AlSi pieces continues with a reasonable velocity and, depending upon the retention time of the mixture at that extraction temperature, the final yield of Al extracted from the AlSi alloy as well s the final Al concentration in the solvent mercury can reach more or less high percentages of the saturation values.

After traversing the charging tube coil 36, the extraction mixture is discharged into a dissolving and separating vessel 38 which is disposed in a furnace 39 (FIG. 6B).

In certain case, it may be preferably, for instance for technological reasons, ti limit the duty of the feed pipe coil 36 by reduction of its length, to the introduction and to heating of the feed mixture to the maximum extraction temperature and to complete the aluminum dissolution in the lower and middle part of the dissolving and separating vessel 38. In some embodiments of the process, the furnace 37 and the vessel 38 together constitute the aluminum dissolving zone.

SEPARATION OF THE UNDISSOLVED RESIDUE

In place of, or as a supplement to, filtration through the residue and undissolved AlSi particles as described in connection with the embodiment of FIG. 3, a type of sand filter 40 composed of sand particles or residue particles having grain sizes ranging in average diameter from a few millimeters to a small fraction of a millimeter may be used to separate the residue from the AlHg solution. These sand or residue particles are placed beneath a gridiron 41 covered with 1 to 3 layers of different steel meshes as support (not shown). This sand may consist of any material insoluble in mercury and mercury alloys of residue particles; however, it must be wettable by mercury. Instead of being located in the top of the dissolving and separating vessel 38, the filter may be located in the bottom and the vessel piping, etc., reversed to filter downwardly instead of upwardly.

It is evident that the filter particles which have to stay beneath the filter support 41 (gridiron) cannot be put in place before the filter tower 38 is filled with mercury.

As the best and easiest method of putting the filter particles in place, the following procedure has been established:

a. The filter tower 38 is filled with mercury through mixing cone 34 and the charging tube 35-36;

b. The filter sand or residue particles are introduced in the same way as provided for the Al alloy particles without them, of course, passing the grinding mill 32, i.e., through the mixing cone 34 and the charging tube 35-36. The filter particles immediately float up to the gridiron 41 (FIG. 6B);

c. When the entire quantity of filter particles is introduced, the particles settle according to their average diameter, i.e., the biggest particles stay on top, and the smaller particles remain below, i.e., the farther from the gridiron 41, the smaller they are. This classification can be accomplished by "-backwashing" with mercury, a procedure which will be described in detail below.

FIG. 6B shows schematically, as an example, the equipment provided with such a filter for the separation of the solid residue from the HgAl phase.

The essential parts of the dissolving and separating vessel 38 are a pear-shaped head piece 42 with the filter particles 40, a cylindrical middle part 43 and an inner piece 44 within the pressure-bearing cylinder 50. Inner piece 44 may be slightly conical toward the bottom (truncated), and cylinder 50 rests on cone 45.

The hot extraction mixture coming from the charging tube coil 36 is discharged into cone 45 and rises through the middle part 43 into the zone below the filter 40. During the retention time of the solid particles and the liquid HgAl phase in the middle part 43 of the dissolving and separating vessel 38, additional dissolving mercury is added to vessel 38 through the line 64 and further Al dissolution still occurs. Additional mercury is added to the dissolving and separating vessel 38 through the line 63 extending from the condenser 62 through a coil in the furnace 37 and line 64 to the screw conveyor 47. In the furnace 37, the mercury flowing through line 63 is heated to the furnace temperature of about 530° C. and when added to the screw conveyor 47 acts to wash the residue in screw conveyor 47 free of Al and enters the vessel 38 where it dissolves more Al.

The solid residue is stopped at the lower surface of the filter 40, while the HgAl phase passes the filter and leaves the tower near the top of the pear-shaped part 42 through pipe 46. The solid residue is carried away continuously by the conveyor screw 47 and transported to the lower end of the vertical residue discharge pipe 48 from which it is discharged at substantially atmospheric pressure into the residue separating vessel 59.

CRYSTALLIZATION OF PURE Al

Figure 6D:
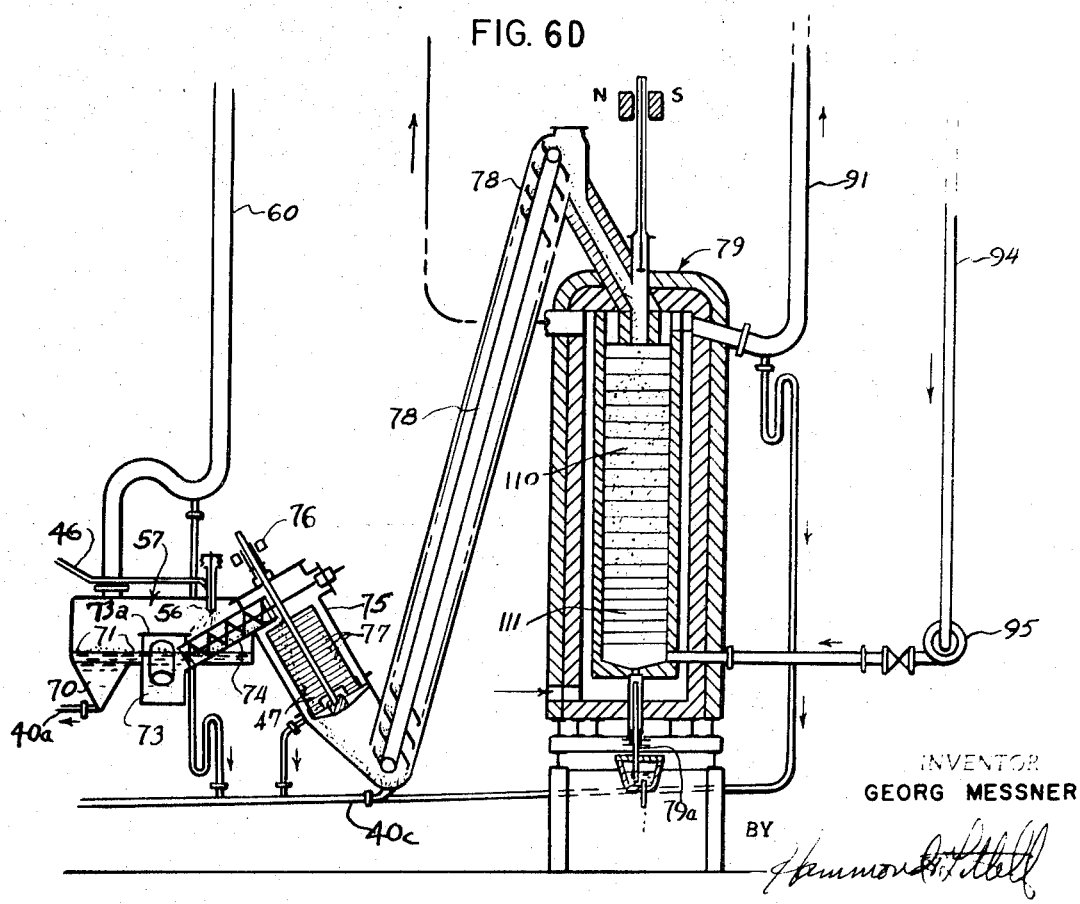
FIG. 6d is a detailed view of the aluminum crystallizing and recovery portion of the process of FIG. 6.
Figure 7:
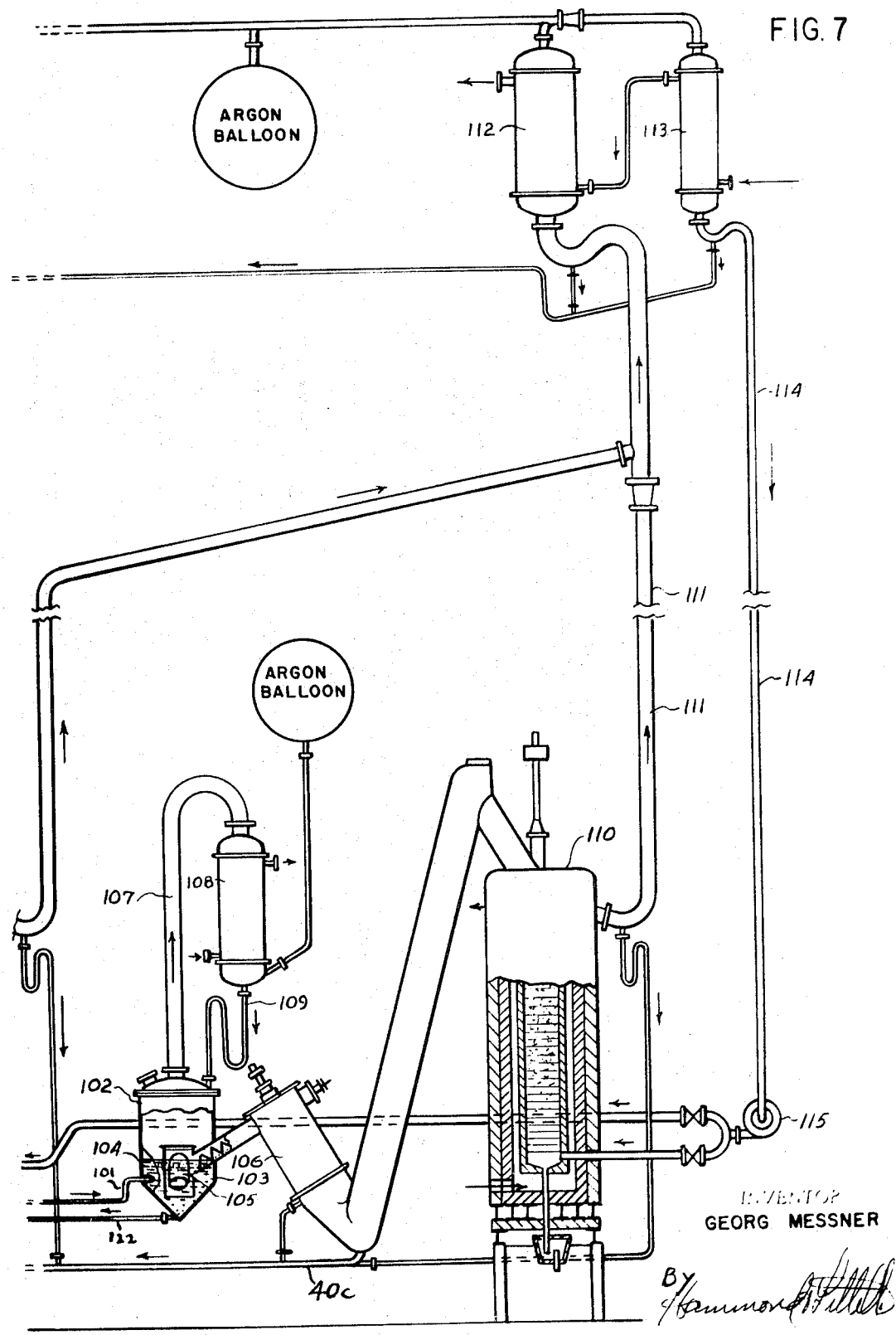
FIG. 7 shows a modified form of the aluminum recovery step.

The filtered HgAl phase from the line 46 enters the spray nozzle 56 and is atomized with the Al crystallizer 57 which is kept at atmospheric pressure (FIGS. 6D and 7).

During the atomization, the particles of the HgAl phase are subjected to a big pressure drop, and a heavy Hg evaporation takes place until the remaining Hg phase has reached its equilibrium temperature at atmospheric pressure, i.e., approximately 357° C.

The Hg vapor leaves the crystallizer 57 through pipe 60 and enters the mixing cone 34, where a part of the Hg vapor is condensed, keeping the mixing cone 34, the screw conveyor 33 and the grinding mill 31a always close to the boiling temperature of Hg, 357° C. The excess of Hg vapor enters the condenser 61 from mixing cone 34. The Hg condensate from 61 flows by gravity into the condensate collector 62. It is mainly fed into pipe 63 which ends in a coil disposed in furnace 37 and connects with pipe 64, leading into the filter tower dissolving and separating vessel 38. The condensate flowing through 63 and 64 is directed to, and serves as wash fluid for, the solid residue in the residue screw conveyor 47 (FIG. 6B) and is added to the mercury in vessel 38 as additional dissolution mercury.

In the crystallizer 57, aluminum crystallizes corresponding to the lower Al solubility in the mercury at about 357° C. and to the amount of the solvent Hg which has disappeared from the liquid phase by evaporation.

Quick separation of the aluminum and mercury can be accomplished by a combined filtration-sedimentation, by turning the HgAl phase spray jet of the nozzle 56 downwards toward the surface of a Hg pool 70 on the bottom of the Al crystallizer 57 which is covered by a layer 71 of Al crystals previously formed. The crystallization of Al from HgAl phase just atomized reaches equilibrium while the droplets of HgAl phase pass the layer 71 of the previously crystallized Al crystals which acts like a nonclogging filter.

The remaining mother liquor is collected at the bottom of pool 70 of the mercury phase and leaves the crystallizer 57 by a line 40a through a hydraulic seal and an overflow (not shown) for recycle through pump tank 72 and Hg pump 31 (FIG. 6) to the first step of the extraction process. A return mercury flow line from the base of vessel 38 to the pump tank 80 is shown at 40b. The layer 71 of Al crystals floating on top of the Hg pool 70, favored by the wedge-shaped ground plan of the crystallizer trough 57, slowly moves towards the conveyor screw 74 (FIG. 6D) which picks up the crystals and transports them through a hydraulic Hg seal 73a and an inclined conveyor screw 74 into the equipment for the separation of mercury from Al.

Another form of apparatus for separation of mercury from Al in a dual step procedure is illustrated in FIGS. 6D, 8 and 8A, which accomplishes:

a. Separation of the bulk of the mercury from the Al crystals;
b. Separation of the last traces of mercury from the Al.

SEPARATION OF THE BULK OF THE MERCURY

Separation of the bulk of the mercury from the Al crystals is done by a new-type centrifuge, although conventional-type centrifuges may be used. The conventional-type centrifuges provide a mechanical tool or plow to remove the centrifuged materials from the centrifuge rotor.

In the separation of pure Al crystals, two difficulties are encountered with conventional centrifuges:

1. the danger of contamination of the pure Al with other metals caused by abrasion of the steel tools of the plows;
2. the pressure of the tools or plows against the centrifuged Al crystal layer in the rotor of a centrifuge causes, by plastic deformation and densification, an unavoidable hardening of the aluminum which can be considered a type of cold welding between the single Al crystals resulting in the formation of a tenacious mass of Al which is difficult to remove from the rotor of the centrifuge. The use of vaportight automatic batch-type centrifuges greatly decreases these difficulties.

The new method will be explained with reference to FIGS. 8, 8A, 9 and 10.

In FIG. 6D, it has been shown that the loose Al crystals formed in spray crystallizer 57 are carried by conveyor screws 74 into a centrifuge 75 whose rotor axis deviates from the vertical position by approximately 30°.

FIG. 8 shows the centrifuge in section; FIG. 8A shows springs holding centrifuge rings and facilitating oscillation, as will be explained below; FIG. 9 is a section through the centrifuge taken along line 9—9 of FIG. 8; and FIG. 10 is a section through the centrifuge taken along line 10—10.

The rotor body preferentially is composed of a number of overlapping sheet rings 101 which form a cylinder or a conelike rotor body 102 connected to the rotor axle 100, disposed in the gastight centrifuge container 103.

Each ring is connected with its upper and lower neighbor by loose bolts and springs 104 or other elastic members. Preferentially, the topmost of the rings is connected to a shaft 105, which is put in oscillation by a vibrator 76, for instance, by an electromagnetic one. The vibration is transferred to all other rings 101 by the springs 104. The centrifuge is preferably rotated at 300 to 600 r.p.m.

The procedure using centrifuge 75 is carried out in the following steps (see FIG. 6D):

a. Al crystals, still with mercury, are introduced by the conveyor screws 73 and 74 into the centrifuge 75, which is at full rotation. The Al crystals are deposited as a layer 77 on the inside surface of the above-mentioned sheet rings of the rotor, while the rotor is at its highest rotational speed. The bulk of the adhering mercury is separated by the centrifugal power and leaves the rotor via the small spaces between the rings;

b. When the quantity of Al crystals deposited in the rotor body is sufficient, the conveyor screws 73 and 74 for the introduction of new Hg wetted Al crystals are stopped, the speed of rotation of the centrifuge 75 is reduced to nearly zero and the magnetic vibrator 76 is put in operation for a few seconds, in order to loosen the Al crystals 77 from the rings of the rotor. The Al crystals fall down, leave the centrifuge 75 and are picked up by a mechanical transportation device 78 which carries them into the Al melting furnace 79. The separated Hg mother liquor is recycled through the line 40c to the extraction process via the Hg deposit tank 80 and the pumps 31 and 31a (see FIG. 1) or joins the other Hg mother liquor for a second Al crystallization, as mentioned above and described below in example 3;

c. The magnetic vibrator 76 is stopped, the rotor of the centrifuge 75 again is put in full rotation, and new Al crystals coming from the Al crystallizer 57 are introduced as described under (a).

SEPARATION OF MERCURY FROM THE SOLID RESIDUE

The same method and practically identical equipment can be used for the liberation of the solid residue from the bulk of the mercury adhering to it. Referring to FIG. 6C, the solid residue floating on the mercury in the residue outlet box 59 is picked up by the conveyor screw 85 and introduced into the residue centrifuge 86. The centrifuged residue is then forwarded into another screw conveyor 87, where it is heated to a temperature above the boiling point of Hg. Nearly all mercury distills off and is driven by a stream of nitrogen or argon or any other inert gas into the condenser 88 (FIG. 6). The Hg condensate flows back to the residue outlet box 59.

SEPARATION OF MERCURY TRACES FROM PURE Al

Referring to FIG. 6D, in furnace 79 Hg is driven off in the upper part 110 without melting the Al eliminating in the lower part 111 the last traces of mercury by melting.

While the liquid aluminum flows downwards, a stream of argon or any other suitable inert gas flows upwards and drives off first the small quantities of Hg vapor from the lower part 111 and then the bigger quantities of mercury, evaporated in the upper part 110. The inert gas loaded with mercury vapor leaves the furnace 79 through pipe 91 and enters the condenser 92 and the after cooler 93. The Hg condensates pass through the line 93a to the mercury collector 62 from which they flow through the line 63 to act as wash and solvent mercury in dissolving and separating vessel 38. The inert gas returns through pipe 94 and gas blower 95 into the melting furnace 79.

CLEANING FILTER

If the filter 40 becomes clogged, this is eliminated by backwashing. The backwashing fluid is mercury at a high temperature. In the case of an extraction temperature of 530° C., the vapor tension of the wash fluid is 11 atmospheres gauge and a still higher pressure has to be applied in order to keep the Hg in the dissolving and separating vessel 38 from boiling. Moreover, the hot washing mercury must be available just when washing is needed, and the introduction of the washing mercury should cause neither change of temperature nor loss of pressure balance between the two mercury columns in the open vertical pipes 35 and 48 which are at substantially atmospheric pressure at their tops and between each one of these two columns and the inside pressure of the vessel 38.

These demands are satisfied by the simple arrangement and procedure described hereinafter.

FIG. 6B shows the vessel 38 composed of two pieces connected to each other by a flange 49. The lower part is composed of a strong cylindrical external part 50 ending in a cone 45 which resists pressure, and an internal part 44, as stated above. The space between these two parts serves as a gasholder 51. On the bottom side, the gasholder 51 is sealed by the mercury which fills all the other spaces of the vessel 38. To the upper end of the gasholder 51, a tube 52 is welded which connects the gasholder 51 with the upper end of the pear-shaped part 42, and a valve 53 is inserted in this tube 52 which serves to connect these two containers or to interrupt this connection. Tube 52, before and after valve 53, is connected to a bypass having therein extra valves 54 and 55 and a pressure control 58, respectively, for the inlet or the outlet of gas. The function of this part of the vessel 38 is as follows:

During normal operation of the filter 40, the gasholder 51 is filled with argon or any other inert gas, e.g., nitrogen, while the other spaces are full of Hg phase which penetrates all other present materials such as solid Al alloy particles, filter sand and extraction residue.

When the filter 40 begins to indicate clogging, i.e., if the pressure drop in the filter rises, backwashing is to be carried out as follows:

a. Introduction of Al alloy into the mixing cone 34 is stopped for 3–4 minutes, while introduction of mercury through the transport and charging tube 35–36 and extraction of residue by the conveyor screw 47 continues;

b. Feeding of HgAl phase into the spray nozzle 56 of the Al crystallizer 57, Hg supply to the mixing cone 34 and to the residue conveyor screw 47, and the residue conveyor screw 47 itself, are stopped;

c. The valve 53 in the gas tube 52 which connects the gasholder 51 with the space 42 above the filter is quickly opened. The mercury phase in the space 42 above the filter immediately falls downwards through the sand residue in filter 40 and cleans the latter, while the corresponding volume of inert gas leaves the gasholder 51 and enters the space 42 above the filter gridiron 41;

d. The valve 53 in the gas tube 52 is now closed. The inert gas is sucked through the corresponding valve 55 from the space 42 above the filter into an automatic pressure control system 58 and forced back through valve 54 into the gasholder 51, where it stays until "backwashing" is executed again. If needed, backwashing is executed again, by repeating at this stage the steps (c) and (d);

e. Hg supply to the transport tube 35 and spraying of the Hg phase through nozzle 56 into the Al crystallizer 57 are started again (see FIG. 6D);

f. Introduction of Al alloy is started again;

g. Operation of the residue conveyor screw 47 is started again.

By this backwashing process, the bulk of the residue particles deposited in the sand layer of the filter 40 during the preceding filter period is dislodged towards the intake opening of the residue screw conveyor 47, and this conveyor can then pick up the residue, extract it from the filter tower 38 and forward it to the vertical riser pipe 48, from where it floats upward into the residue outlet box 59.

Although in the preceding explanations and in the examples to follow solely aluminum-silicon alloys have been named, any other alloy can be employed with equally good effect, provided the second metal is insoluble or at least only slightly soluble in mercury. Thus, it is feasible to obtain, e.g., a residue rich in beryllium (in lieu of silicon). Beryllium is insoluble in hot mercury and can be recovered from the enriched residue.

The invention now will be further explained by the following examples, detailing specific embodiments. However, it should be understood that these are given merely by way of illustration, and not of limitation, and that numerous changes may be made in the details without departing from the spirit and the scope of the invention as hereinafter claimed.

All percentages given in the examples are percent by weight.

EXAMPLE 1

590 kg./hr. of an alloy with 75 percent Al and 25 percent Si plus other insolubles in Hg in form of grains with about 4–10 mm. average diameter are fed batchwise into container 1b.

The regulable feeder 2 feeds continuously the same 590 kg./hr. of AlSi feed material into the feed cone 3, where a continuous stream of 60,000 kg./hr. of Hg is tangentially introduced as carrier mercury at about 350° C. It entrains the AlSi grains into the vertical feed pipe 4 underneath cone 3, and carries them into the release chamber 5a, where the coarse solid feed material floats up by its buoyancy into the dissolving vessel 5, while fines which might be formed by abrasion from the coarser material together with Hg are sucked into the Hg circulation pump 8 and recycled into feed cone 3, via line 3a. The carrier Hg is circulated by the line 4b, pump 8 and line 3a and does not dissolve Al from the AlSi feed, because it is always Al saturated.

While the 60,000 kg./hr. carrier Hg, together with the AlSi feed material, pass the heat exchanger 4a, the mixture is heated up to about 360° C., so that the AlSi feed arrives in the dissolving vessel 5 with a temperature of about 360° C. The AlSi feed grains are deposited underneath the rotating paddle system, forming a filter bed of about 15 cm. thickness (average). While the AlSi feed grains pass slowly upwards, forwarded by their buoyancy as well as by the action of the rotating paddle system, a stream of 61,070 kg./hr. of recycled dissolution mercury is introduced through line 10 into the top of the dissolving vessel 5 at a temperature of about 520° C.

As this Hg stream at 520° C. and the solid AlSi grains penetrate each other by their countercurrent flow, the temperature of the solid material rises up to about 520° C. and the temperature of the mercury phase decreases to about 485° C., corresponding to their heat capacities. During this countercurrent penetration, Al is leached out from he AlSi grains by the mercury, which leaves the dissolver 5 on its bottom through line 10e as an Al solution in Hg with about 2.1 percent by weight of Al and a temperature of 485° C. The rising solid material is contemporaneously transformed into a residue powder with mainly Si and a residual Al content of approximately 15 percent Al, perfectly wetted with Hg. The 174 kg./hr. residue powder (on "dry" basis) are picked up by the sloped screw conveyor 7 fitted to the upper part of the dissolving vessel 5, forwarded to the connection with the vertical residue riser pipe 4h full of Hg, where they rise by their buoyancy and aided by another stream of approximately 30,000 kg./hr. of carrier Hg from the line 11h up into residue outlet box 11. Here, they float on the surface of a permanent Hg pool 11 m., ready to be continuously taken away by another sloped screw conveyor 11b, which drops the Hg wet residue into the intake opening 11 of a residue dryer 12, indirectly heated up by combustion gases to about 700° C. for evaporation of practically all Hg and is finally discharged through a sluice system of the water-cooled containers 12a and 12b.

In the upper part of the dissolving vessel, there is maintained by corresponding addition and release of $N_2$-gas, from the bottles 14, a permanent cushion of $N_2$-gas which prevents the specifically lighter AlHg solution formed in the dissolver from rising upwards and mixing with the residue in the slope screw conveyor 7. Such a mixture could clog the screw conveyor by crystallization of Al and stop the process.

The AlHg solution at 485° C. flows by its own pressure through the line 10e to spray valve 15a in crystallizer 15, which releases the hot solution into the large cylindrical spray tower 15 with water-cooled steel walls which is kept under atmospheric pressure by connection with an argon gasholder. The spray jet is directed towards the Hg pool 15b on the bottom of the tower 15, covered with about 3 cm. thick layer of previously formed Al crystals. The drops of sprayed AlHg solution cool rapidly to the Hg boiling temperature at atmospheric pressure (about 360° C.), and crystallization of Al mainly in contact with the Al crystal layer, takes place. The Hg mother liquid with 0.47 percent dissolved Al seeps through the Al crystal layer, which acts as a filter, and leaves the spray crystallizer tower on its lowest point, 15g. On this point, there are two possibilities for the further treatment of the Hg mother liquid, composed of 61,070 kg./hr. of Hg and 292 kg./hr. of dissolved Al One possibility is to heat it up by about 10° C. by a heat exchanger with molten salt flowing in the mantle, to discharge it through an overflow hydraulic seal and to run it back through the line 15g into pump tank 13a of Hg pump 13, as shown in FIG. 1.

The other possibility is to cool it to a lower temperature, producing some more pure Al crystals, which have a still higher purity, up to about 99.999 percent Al and more.

The Al crystal layer in the spray/crystallization tower 15 is kept in a permanent slow rotation by the blades 15c. A bucket conveyor 16 picks continuously parts of the Al crystal layer up and drops them into a pressing device or into a centrifugation device, preferentially a roll-type press 17, which squeezes out a part of the Hg adhering to the Al crystals. The squeezed out Hg flows back into the Hg pool of the spray/crystallization tower the still Hg wetted Al crystals are fed by a screw or other type of conveyor 17f into the gas or oil fired vertical melting furnace 18, where all Hg is driven off and the Al is melted, heated up to 750°–800° C. and drained off through a liquid Al hydraulic seal.

The production in this case is 416 kg./hr. of Al with more than 99.95 percent Al. This production is 10 metric tons per day.

EXAMPLE 2

Applicable figures in the drawings are FIGS. 6, 6A, 6B, 6C and 6D.

223 g./sec. of an alloy composed of 60 percent Al and 40 percent Si, Fe, Ti and minor amounts of other elements are introduced through a water-cooled feeder and the inclined screw conveyor 32 into the grinding mill 31a full of mercury at approximately 350° C. The ground and Hg wetted hot pieces of AlSi alloy together with 4,067 g./sec. of recycled mother liquor with 29 g./sec. of dissolved Al pass the screw conveyor 33 and enter the mixing cone 34. Simultaneously, 362 g./sec. of mercury condensate coming from the overflow pipe of the condensate collector 62 enter the mixing cone 34 and flow, together with the above said Hg mother liquor and with the Al alloy particles by the own weight of this mixture, down through a vertical 1-inch pipe 35, whose lower part forms coil 36 of a total length of substantially 160 m. The coil 36 is placed in a gas- or oil-fired furnace 37. After the mixture has passed about one-third of the total length of the 1-inch pipe, it has attained a temperature of about 530° C. which is maintained during its further travel.

Dissolution of 123 g./sec. Al from the AlSi particles takes place in addition to the 29 g./sec. of Al contained in the recycled mother liquor.

The hot mixture now enters the dissolving and separating vessel 38, where the 98.8 g./sec. solid residue, containing 89g./sec. of Si, Fe, Ti, etc., and 9.8 g./sec. undissolved Al are detained by the inverted sand filter 40.

The solid residue is picked up by the conveyor screw 47 and transported toward the residue riser or discharge tube 48. On its way through the screw conveyor, the residue is washed by 700 g./sec. hot pure mercury condensate, introduced through pipe 64 into the middle of the length of the screw conveyor 47. This washing mercury flows in countercurrent to the residue and joins the HgAl phase in the vessel 38.

The 98.8 g./sec. solid residue are transported by the conveyor screw 47 to the vertical discharge tube 48, float upwards into the residue outlet box 59 and are introduced, together with approximately 724 g./sec. of adhering mercury, into the vibration centrifuge 86, where most of the adhering mercury is separated from the solid. Then approximately 395 g./sec. of centrifuged residue enter the heated screw conveyor 87, where nearly all mercury is distilled off.

The Hg vapor formed is driven into condenser 88 by a stream of nitrogen or any other inert gas. The mercury condensate returns by gravity into the residue outlet box 59. The "dry" residue, a black powder, can be discharged through a sluice device 89.

The approximately 5,253 g./sec. total HgAl phase pass the sand filter 40, leave the vessel 38 through pipe 46 and are atomized under their own pressure by the spray nozzle 56 into the Al crystallizer 57, which is at atmospheric pressure. By the pressure reduction, about 700 g./sec. Hg evaporate, the temperature of the HgAl phase decreases to about 357° C., and 120.5 g./sec. aluminum crystallize. These Al crystals with approximately 1,000 g./sec. adhering mercury are centrifuged in the special oscillation centrifuge 75. They still contain some mother liquor and Al dissolved therein after centrifuging, and are transported by device 78 into melting furnace 79. After melting in the furnace, 123 g./sec. aluminum leave the furnace in liquid form through the bottom discharge outlet 79a and without any detectable trace of mercury. The purity of the aluminum is 99.9 percent Al. By the application of a filter area bigger than 1 m.$^2$ in the vessel 38, the purity of the aluminum thus produced can be increased even further.

The 700 g./sec. Hg vapor formed in the spray-crystallizer 57 flow through pipe 60 into the mixing cone 34. Therein as much Hg vapor is condensed as is needed for heating of the recycled Hg mother liquor and the AlSi particles from about 300° to 357° C. The excess of Hg vapor flows into the condenser 61 and returns as liquid Hg into the condensate collector 62.

The Hg vapors formed in the Al melting furnace 79 are driven by a stream of argon or any other suitable inert gas, through pipe 91 into the mercury condenser 92 and the after cooler 93. They condensates join other mercury condensates of the process which are partially used as washing liquid for the residue, partially they enter by overflow into the mixing cone 34 for the extraction of new Al alloy.

The remaining 4,067 g./sec. mother liquor containing 29 g./sec. dissolved Al are recycled to the pump tank 72, mercury pump 31 and to the grinding mill 31a, where they are mixed with new AlSi particles and fed to the mixing cone 34.

EXAMPLE 3

This example refers to FIG. 7 besides FIGS. 6, 6A, 6B, 6C and 6D.

If higher purity aluminum is desired rather than the Al produced according to example 2, the 4,067 g./sec. Hg mother liquor containing 29 g./sec. of dissolved Al at 357° C. from the Al crystallizer 57 (FIG. 6) flow through pipe 101 into the crystallizer 102 which contains a Hg phase pool 103 and, on top of this pool a layer 104 of liquid hexene boiling at 69°

C./760 mm. Hg. The HgAl phase entering therein is cooled rapidly to 69° C. by mixing it with the HgAl phase present. 27 g./sec. high purity Al crystallize and float on top of the Hg phase pool 103. These Al crystals are transported through a Hg phase seal (not shown) by the conveyor screw 105 and into the vibration centrifuge 106 of the same type as described in example 2 as centrifuge 75. The Hg mother liquor flows through pipe 122 into the pump tank 72 (FIG. 6) and thence into the pump 31. From the pump the mother liquor passes a special preheater coil in furnace 37, and is recycled from there by direct pipe (not shown) into the grinding mill 31a, where it is used for the treatment of 223 g./sec. of new AlSi alloy as described in example 2.

The evaporated hexene (approximately 0.48 kg./sec.) passes through the duct 107 into the water-cooled condenser 108, is condensed and flows by gravity through a hydraulic hexene seal in pipe 109 back into the crystallizer 102, where in joins the layer 104 of boiling hexene.

The centrifuged high purity Al crystals are melted in the furnace 110 similar to the Al melter 79 described in example 2. This aluminum contains less than $10^{-2.6}$ percent by weight of mercury and more than 99.99 percent aluminum.

The mercury vapor from furnace 110 is driven by a stream of argon or any other suitable inert gas through duct 111 into the condenser 112 with the after cooler 113. The gas stream returns through pipe 114 and blower 115 to the furnace 110.

The mercury condensate from 112 and 113, together with Hg condensate from condenser 61 (FIG. 6), flows into the condensate collector 62 and is partially recycled by overflow to the mixing cone; partially it is used for washing the solid extraction residue in the screw conveyor 47 (FIG. 6B) and for dissolution mercury in vessel 38 after it had been heated to 530° C. by being conducted through the furnace 37, as described in example 2.

EXAMPLE 4

The quantities of Al alloy, as in examples 2 or 3, and the corresponding quantities of mercury phase as solvent and transport mercury are introduced, as explained in these examples, into the charging tube 35 which has a length of approximately 50–60 meters, just enough to insure that the feed mixture actually is heated to the desired maximum extraction temperature of 530° C., while the dissolution of the main quantities of aluminum, still undissolved when leaving the charging tube coil, is performed during the retention time of the mixture of Hg phase and solid Al alloy particles in the lower and middle part of the vessel 38. In this case, the free volume of the lower and middle part of the filter vessel 38 must be slightly larger than in the cases of examples 2 and 3.

Although the invention has been described in considerable detail, automatic instrumentation, controls, gauges and other parts well understood, have been omitted for clarity in describing and illustrating the various processes. The examples have been based upon dissolving temperature of approximately 520° to 530° C., but it will be understood that higher or lower dissolving temperatures may be used with a corresponding increase or decrease in the weight percent of aluminum dissolved, and modifications and changes may be made in the process described and parts of one embodiment of the process may be used with a part of another embodiment without departing from the spirit of my invention.

I claim:

1. The process of recovering relatively pure aluminum from an aluminum alloy which comprises feeding said aluminum alloy into a stream of liquid transport mercury at substantially atmospheric pressure, transporting said aluminum alloy and mercury mixture downwardly in a first mercury column into an aluminum dissolving zone, passing said aluminum alloy mercury mixture in said first mercury column into a horizontally enlarged, vertically elongated reservoir in said dissolving zone, heating said mixture in the aluminum dissolving zone to a temperature of approximately 530° C. and maintaining the aluminum dissolving zone at a pressure in excess of 11 atm. by the weight of said first mercury column and a second mercury column both at substantially atmospheric pressure at their tops, dissolving aluminum from said alloy in mercury in said dissolving zone, separating the aluminum-mercury solution from the relatively insoluble solid residue of said aluminum alloy in said enlarged reservoir, separating mercury from said aluminum-mercury solution and recycling a portion of said mercury to the top of said first mercury column, removing the relatively insoluble solid impurities originally contained in said aluminum alloy from said enlarged reservoir and flowing said impurities upwardly in said second mercury column, discharging said impurities at substantially atmospheric pressure from the top of said second mercury column, removing an aluminum-mercury solution from said enlarged reservoir, cooling said solution to crystallize aluminum therefrom, freeing the aluminum crystals from contained mercury, melting said crystals and recovering substantially pure aluminum therefrom and recovering the mercury contained in said aluminum-mercury solution and recycling said mercury to said process.

2. The method of claim 1 in which the aluminum is crystallized by spraying the aluminum-mercury solution at super atmospheric pressure and about 485° C. into a crystallization zone at atmospheric pressure, to vaporize mercury therefrom and cool the solution to crystallize aluminum therefrom.

3. The method of claim 1 in which mercury from a third mercury stream is heated to approximately 520° C. and flowed into said horizontally enlarged, vertically elongated reservoir to dissolve more aluminum from said alloy.

4. The method of claim 1 in which mercury is withdrawn from the base of said reservoir and recirculated to the top of said liquid mercury transport stream.

5. The method of claim 1 in which mercury is flowed through a bed of solid residue particles in said aluminum dissolving zone to remove aluminum from said solid residue particles.

6. The process of recovering relatively pure aluminum from an aluminum alloy which comprises feeding said aluminum alloy into a stream of mercury in liquid phase at substantially atmospheric pressure, transporting said aluminum alloy and mercury mixture downwardly in a first mercury column into an aluminum dissolving zone, heating said mixture in the aluminum dissolving zone to a temperature of approximately 530° C. and maintaining the aluminum dissolving zone at a pressure in excess of 11 atmospheres by the weight of said first mercury column and a second mercury column both at a substantially atmospheric pressure at their tops, dissolving aluminum from said alloy in mercury in said dissolving zone, removing mercury from said aluminum-mercury solution and recycling said mercury to the top of said first mercury column, removing solid insoluble impurities originally contained in said aluminum alloy from said dissolving zone and flowing said impurities upwardly in said second mercury column, discharging said impurities at substantially atmospheric pressure from the top of said second mercury column, removing an aluminum-mercury solution at a temperature of approximately 530° C. and pressure in excess of 11 atmospheres from said dissolving zone, vaporizing mercury from said solution at atmospheric pressure to cool said solution and crystallize aluminum therefrom, freeing the aluminum crystals from contained mercury, melting said crystals and recovering substantially pure aluminum therefrom and recovering the mercury contained in said aluminum-mercury solution and recycling said mercury to said process.

7. The process of recovering relatively pure aluminum from an aluminum alloy which comprises continuously feeding said aluminum alloy in solid phase into a stream of mercury in liquid phase at substantially atmospheric pressure, transporting said aluminum alloy and mercury mixture downwardly in a first mercury column into an enlarged aluminum dissolving zone maintained at a temperature of approximately 530° C. and a pressure in excess of 11 atmospheres, maintaining the pressure of the dissolving zone by the weight of said first mercury column and a second mercury column both at substantially atmospheric pressure at their tops, adding additional mercury to said dissolving zone from a third mercury column, dissolving aluminum in mercury in said dissolving zone, removing mercury from the bottom of said dissolving zone and recycling said mercury at the top of said first mercury column, removing solid impurities from said dissolving zone and flowing said impurities upwardly in said second mercury column, discharging said impurities at substantially atmospheric pressure from the top of said second mercury column, continuously removing an aluminum-mercury solution from said dissolving zone, cooling said solution to crystallize aluminum therefrom, freeing the aluminum crystals from contained mercury, melting said crystals and recovering substantially pure aluminum therefrom and recovering the mercury contained in said aluminum-mercury solution and recycling said mercury to said process.

8. The method of claim 1 in which the aluminum is crystallized by vaporizing mercury from the aluminum-mercury solution at atmospheric pressure to cool said solution.

9. The process of recovering relatively pure aluminum from an aluminum alloy, which comprises continuously feeding said aluminum alloy in solid phase into a transport stream of heated mercury in liquid phase at substantially atmospheric pressure and at a temperature of about 357° to 360° C., transporting said aluminum alloy and mercury mixture downwardly in a first mercury column into an aluminum dissolving zone, heating said aluminum alloy in its passage downwardly in said mercury column, discharging said aluminum alloy mercury mixture into an enlarged vertically elongated dissolving and separating chamber in said dissolving zone, maintaining said aluminum alloy mixture in said aluminum dissolving zone at a temperature of about 520° C. and maintaining said mixture at a pressure in excess of 11 atmospheres in said dissolving zone by the weight of said first mercury column and a second mercury column both at substantially atmospheric pressure at their tops, adding additional mercury to said dissolving zone from a third mercury stream, dissolving aluminum in mercury in said dissolving zone, removing mercury from said dissolving zone and recycling said mercury to the top of said first mercury column, removing solid impurities from said dissolving zone, washing said impurities with mercury and flowing said impurities upwardly in said second mercury column, discharging said washed impurities at substantially atmospheric pressure from the top of said second mercury column, continuously removing an aluminum-mercury solution from said dissolving zone, cooling said solution by spraying into a crystallizing chamber at substantially atmospheric pressure to crystallize aluminum therefrom freeing the aluminum crystals from contained mercury, melting said crystals and recovering substantially pure aluminum therefrom and recovering the mercury contained in said aluminum-mercury solution and recycling said mercury to said process.

10. The method of claim 9 in which mercury is removed from the bottom of said dissolving zone and recycled through an aluminum alloy transport circuit and an aluminum alloy continuously added to said mercury transport circuit.

11. The method of claim 9 in which the aluminum alloy is in average particle sizes of less than 50 mm. and is transported in said mercury transport stream at a speed of approximately 50 to 100 cm. per second.

12. The process of recovering relatively pure aluminum from an aluminum alloy which comprises feeding said aluminum alloy into a stream of mercury in liquid phase at atmospheric pressure, transporting said aluminum alloy and mercury mixture downwardly in a first mercury column into an enlarged aluminum dissolving zone, heating said mixture in the aluminum dissolving zone to a temperature of about 520° C. and maintaining the aluminum dissolving zone at a pressure in excess of 11 atm. by the weight of said first mercury column and a second mercury column both at substantially atmospheric pressure at their tops, feeding additional mercury into said dissolving zone from a third column of mercury, dissolving aluminum from said alloy in mercury in said dissolving zone, removing solid insoluble impurities originally contained in said aluminum alloy from said dissolving zone and flowing said impurities upwardly in said second mercury column, discharging said inpurities at substantially atmospheric pressure from the top of said second mercury column, removing an aluminum-mercury solution at a pressure of about 11 atmospheres from said dissolving zone, vaporizing mercury from said solution at atmospheric pressure to cool said solution and crystallize aluminum therefrom, freeing the aluminum crystals from contained mercury, melting said crystals and recovering substantially pure aluminum therefrom and recovering the mercury contained in said aluminum-mercury solution and recycling said mercury to said process.

13. The method of claim 12 in which mercury is removed from below the dissolving zone and recirculated in a mercury transport circuit to the top of said first mercury column.

14. The process of recovering relatively pure aluminum from an aluminum alloy, which comprises continuously feeding said aluminum alloy into a recycle stream of heated transport mercury in liquid phase at substantially atmospheric pressure and at a temperature of about 357° to 360° C., transporting said aluminum alloy and mercury mixture downwardly in a first mercury transport column into an enlarged aluminum dissolving and residue separating zone, heating said aluminum alloy in its passage downwardly in said mercury column, adding additional mercury heated to above 520° C. to said dissolving and separating zone, maintaining said aluminum alloy mixture in said aluminum dissolving and residue separating zone at a temperature of above about 520° C. and maintaining said mixture at a pressure in excess of 11 atmospheres in said dissolving and separating zone by the weight of said first mercury column and a second mercury column both at atmospheric pressure at their tops, dissolving aluminum in mercury in said dissolving zone, removing mercury from said dissolving and separating zone and recycling said mercury to the top of said first mercury column, removing solid impurities from said dissolving zone, washing said impurities with mercury and flowing said impurities upwardly in said second mercury column, discharging said washed impurities at substantially atmospheric pressure from the top of said second mercury column, continuously removing an aluminum-mercury solution from said dissolving zone, vaporizing mercury from said solution at atmospheric pressure to cool said solution and crystallize aluminum therefrom, freeing the aluminum crystals from contained mercury, melting said crystals and recovering substantially pure aluminum therefrom and recovering the mercury contained in said aluminum-mercury solution and recycling said mercury to said process and recovering the mercury contained in said solid impurities.

15. The process of recovering relatively pure aluminum from an aluminum alloy which comprises feeding said aluminum alloy in solid phase into a stream of mercury in liquid phase at substantially atmospheric pressure, transporting said aluminum alloy and mercury mixture downwardly in a first mercury column into an aluminum dissolving zone, flowing the aluminum alloy and mercury mixture into an enlarged vertical separating and dissolving zone, dissolving aluminum from said alloy in mercury in said dissolving zone, adding additional mercury heated to between 500° and 600° C. to said dissolving and separating zone, maintaining the aluminum dissolving zone at a pressure in excess of 11 atmospheres by the weight of said first mercury column and a second mercury column both at atmospheric pressure at their tops, removing mercury from below said enlarged separating and dissolving zone and recycling said mercury to the top of said first mercury column, removing solid less soluble impurities originally contained in said aluminum alloy from said enlarged separating and dissolving zone and flowing said impurities upwardly in said second mercury column, discharging said impurities at substantially atmospheric pressure from the top of said second mercury column, removing an aluminum-mercury solution from said enlarged separating and dissolving zone, cooling said solution to crystallize aluminum therefrom, freeing the aluminum crystals from contained mercury, melting said crystals and recovering substantially pure aluminum therefrom and recovering the mercury contained in said aluminum-mercury solution and recycling said mercury to said process.

16. The process of recovering relatively pure aluminum from an aluminum alloy which comprises feeding said aluminum alloy into a stream of mercury in liquid phase at substantially atmospheric pressure, transporting said aluminum alloy and mercury mixture downwardly in a first mercury column into an aluminum dissolving zone, flowing the aluminum alloy and mercury mixture into an enlarged vertical dissolving and separating zone, adding additional mercury heated to approximately 520° C. to said enlarged vertical dissolving and separating zone, maintaining the aluminum dissolving zone at a pressure in excess of 11 atmospheres by the weight of said first mercury column and a second mercury column both at atmospheric pressure at their tops, dissolving aluminum from said alloy in mercury in said dissolving zone, removing mercury from below said enlarged separating and dissolving zone and recycling said mercury to the top of said first mercury column, removing solid less soluble impurities originally contained in said aluminum alloy from said enlarged separating and dissolving zone and flowing said impurities upwardly in said second mercury column, discharging said impurities at substantially atmospheric pressure from the top of said second mercury column, removing an aluminum-mercury solution at a temperature of approximately 500° C. and pressure in excess of 11 atmospheres from said enlarged separating and dissolving zone, vaporizing mercury from said solution at atmospheric pressure to cool said solution and crystallize aluminum therefrom, freeing the aluminum crystals from contained mercury, melting said crystals and recovering substantially pure aluminum therefrom and recovering the mercury contained in said aluminum-mercury solution and recycling said mercury to said process.

17. Process according to claim 1, characterized by the fact that all heat is introduced into the dissolving zone by means of heated dissolution mercury, the aluminum alloy is introduced at a lower temperature than the heated dissolution mercury, the formed aluminum mercury solution is cooled by the colder solid aluminum alloy particles and the solid aluminum alloy particles move in countercurrent to the hot dissolution mercury.

18. Method of countercurrent leaching of aluminum from an aluminum alloy with hot mercury in an essentially vertical dissolver vessel, characterized by the feeding of the solid aluminum alloy into the bottom of the dissolver vessel and the feeding of the hot mercury into the top portion of the dissolver vessel above the point of the aluminum alloy feed, and by mixing the hot mercury and the aluminum alloy by system of two sets of agitators with paddles in the dissolver vessel, said paddles rotating in opposite directions relative to each other, the angles of the paddles being such that they all have a lifting effect on the solid particles in the dissolver vessel.

19. Method according to claim 18, characterized by a system of two sets of agitators with paddles, one set rotating, the other one not rotating, with the same angles as indicated in claim 18.

20. Method according to claim 8, characterized by a bed of hot agitated, new aluminum alloy feed particles underneath the agitator paddle sets, operating as nonclogging filter for the elimination of residue fines present in the downwards flowing mercury-aluminum solution by entrainment, the thickness of this filtration bed being kept at its optimum value and approximately constant by adjustment of aluminum alloy feed rate and rotation speed of the paddle cylinders.

21. Method according to claim 18, characterized by the use of hot dissolution mercury entering the upper part of the dissolving vessel as a shower liquid in the inert gas filled space by distributing it over nearly the whole horizontal cross section of the dissolving vessel.

* * * * *